US012118655B2

(12) United States Patent
Meina et al.

(10) Patent No.: US 12,118,655 B2
(45) Date of Patent: Oct. 15, 2024

(54) MINIMAL LATENCY APPARATUS AND METHOD FOR SUPPORTING FOVEATED RENDERING

(71) Applicant: Inseye Inc., Beacon, NY (US)

(72) Inventors: Michal Meina, Toruń (PL); Piotr Krukowski, Toruń (PL); Piotr Redmerski, Lipno (PL)

(73) Assignee: Inseye Inc., Beacon, NY (US)

( * ) Notice: Subject to any disclaimer, the term of this patent is extended or adjusted under 35 U.S.C. 154(b) by 0 days.

(21) Appl. No.: 18/211,156

(22) Filed: Jun. 16, 2023

(65) Prior Publication Data

US 2023/0410405 A1 Dec. 21, 2023

Related U.S. Application Data

(60) Provisional application No. 63/353,398, filed on Jun. 17, 2022.

(51) Int. Cl.
*G06T 15/00* (2011.01)
*G06F 3/01* (2006.01)

(52) U.S. Cl.
CPC ............ *G06T 15/005* (2013.01); *G06F 3/013* (2013.01)

(58) Field of Classification Search
None
See application file for complete search history.

(56) References Cited

U.S. PATENT DOCUMENTS 9,230,501 B1 * 1/2016 Starner .................. G06F 3/147
10,739,849 B2 8/2020 Stafford et al.
2017/0068312 A1 * 3/2017 Mallinson ...... H04N 21/234345
2019/0204913 A1 * 7/2019 Sarkar ................ G02B 27/0093
2021/0173474 A1 * 6/2021 Sztuk .................... G06T 19/006
2021/0191513 A1 * 6/2021 Young ................... G06F 1/3231
2021/0318558 A1 * 10/2021 Tzvieli ............... G02B 27/0093
2021/0373657 A1 * 12/2021 Connor ..................... G06T 5/90
2022/0155860 A1 * 5/2022 Tzvieli ................. H04N 23/667
2023/0004015 A1 * 1/2023 Wang .................. G02B 27/286

OTHER PUBLICATIONS

Stein, Niklas et al., A Comparison of Eye Tracking Latencies Among Several Commercial Head-Mounted Displays, SAGE, 2021, pp. 1-16, vol. 12(I), i-Perception (journals.sagepub.com/home/ipe).

* cited by examiner

*Primary Examiner* — Andrew G Yang
(74) *Attorney, Agent, or Firm* — Howard & Howard Attorneys PLLC

(57) ABSTRACT

A virtual reality/augmented reality (VR/AR) wearable assembly is described herein. The VR/AR wearable assembly includes a display device, a photosensor oculography (PSOG) assembly including an eye tracking assembly, and a processor coupled to the PSOG assembly and the display device. The processor including an eye-tracking module configured to execute an algorithm to render computer-generated images on the display device including the steps of detecting a saccade of a corresponding eye of the patient via the eye tracking assembly and determining an initial saccade gaze position location of the corresponding eye associated with the detected saccade, determining a peak velocity of the saccade, determining a final saccade end gaze position based on the determined peak velocity of the saccade, and rendering a foveated image on the display device at an image location corresponding to the determined final saccade end gaze position.

20 Claims, 25 Drawing Sheets

MINIMAL LATENCY APPARATUS AND METHOD FOR SUPPORTING FOVEATED RENDERING

CROSS-REFERENCE TO RELATED APPLICATION

This application claims the benefit of U.S. Provisional Patent Application Ser. No. 63/353,398, filed Jun. 17, 2022, the disclosure of which is hereby incorporated by reference in its entirety.

TECHNICAL FIELD

The present invention relates to virtual reality/augmented reality/mixed reality (VR/AR/MR) head-mounted display (HMD) units and, more specifically to minimal latency apparatus and methods supporting foveated rendering.

BACKGROUND OF THE INVENTION

The human retina has very small (~1.5 deg) region of high visual acuity called fovea. Outside the fovea the distribution of retinal components changes rapidly, resulting in decreased visual acuity and less sensitivity to color. Foveated rendering is an image rendering technique which uses an eye tracker integrated with a virtual reality headset to reduce the rendering workload by greatly reducing the image quality in the peripheral vision. In order to render a foveated image (i.e., image with lower rendering quality in region outside the fovea) the rendering system needs to know the position of gaze location with respect to the rendered image coordinate system.

The eye-tracking module is a key component for delivering foveated rendering technique and two its main characteristics needs to be considered: (1) eye-tracking accuracy, which corresponds to the difference between the estimated gaze location and actual eye position and (2) system latency—the amount of time that is needed to deliver information from eye-tracking to the rendering system. Whereas the acceptable accuracy could be achieved using existing eye tracking technologies, especially with the assumption that the size of foveated region can be increased to mitigate small to moderate errors. However due to the fact that the human eye is constantly in motion the system latency is still a current challenge to overcome.

One of the fastest eye movements that the human eye can produce is saccade. Saccades can reach speed up to 700 deg/s, traveling angular distance up to 12-15 deg. Depending on the visual task the frequency of saccades varies from 0.3 up to 2 saccades per seconds. Such fast changes in eye position needs to be taken into account with very small latency in rendering pipeline. During a saccade the visual system is suppressed (saccadic suppression), but other functions of the visual system can influence perception and post-saccadic motion. From user-oriented perspective it is reported that latency of 28 ms is still too high to have “unnoticeable” changes of foveated image.

The present invention is aimed at one or more of the problems identified above.

SUMMARY OF THE INVENTION

In one aspect of the present invention, a virtual reality/augmented reality (VR/AR) wearable assembly is provided. The VR/AR wearable assembly includes a wearable frame adapted to be worn over a patient’s eyes, a display device mounted to the wearable frame, a photosensor oculography (PSOG) assembly mounted to the wearable frame and including an eye tracking assembly, and a processor coupled to the PSOG assembly and the display device. The processor includes an eye-tracking module configured to execute an algorithm to render computer-generated images on the display device including the steps of detecting a saccade of a corresponding eye of the patient via the eye tracking assembly and determining an initial saccade gaze position location of the corresponding eye associated with the detected saccade, determining a peak velocity of the saccade, determining a final saccade end gaze position based on the determined peak velocity of the saccade, and rendering a foveated image on the display at an image location corresponding to the determined final saccade end gaze position In another aspect of the present invention, a method of operating a VR/AR wearable assembly is provided. The VR/AR wearable assembly includes a wearable frame adapted to be worn over a patient’s eyes, a display device mounted to the wearable frame, a PSOG assembly mounted to the wearable frame and including an eye tracking assembly, and a processor coupled to the PSOG assembly and the display device. The method includes the processor performing an algorithm to render computer-generated images on the display device including the steps of detecting a saccade of a corresponding eye of the patient via the eye tracking assembly and determining an initial saccade gaze position location of the corresponding eye associated with the detected saccade, determining a peak velocity of the saccade, determining a final saccade end gaze position based on the determined peak velocity of the saccade, and rendering a foveated image on the display device at an image location corresponding to the determined final saccade end gaze position.

In a further aspect of the present invention, a non-transitory computer-readable storage media having computer-executable instructions embodied thereon to operate a VR/AR wearable assembly is provided. The VR/AR wearable assembly includes a wearable frame adapted to be worn over a patient’s eyes, a display device mounted to the wearable frame, a PSOG assembly mounted to the wearable frame and including an eye tracking assembly, and a processor coupled to the PSOG assembly and the display device. The computer-executable instructions cause the processor to perform an algorithm to render computer-generated images on the display device including the steps of detecting a saccade of a corresponding eye of the patient via the eye tracking assembly and determining an initial saccade gaze position location of the corresponding eye associated with the detected saccade, determining a peak velocity of the saccade, determining a final saccade end gaze position based on the determined peak velocity of the saccade, and rendering a foveated image on the display device at an image location corresponding to the determined final saccade end gaze position.

BRIEF DESCRIPTION OF DRAWINGS

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein.

Corresponding reference characters indicate corresponding components throughout the several views of the drawings.

DETAILED DESCRIPTION OF THE INVENTION

Figure 1:
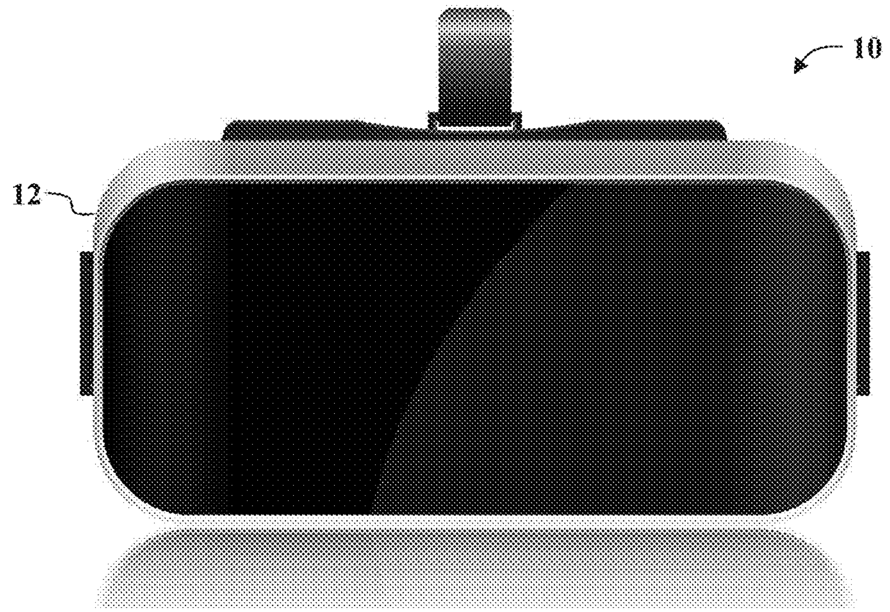
FIGS. 1 and 2 are schematic diagrams of a system including a head mounted display unit and an eye tracking system, according to embodiments of the present invention.
Figure 2:
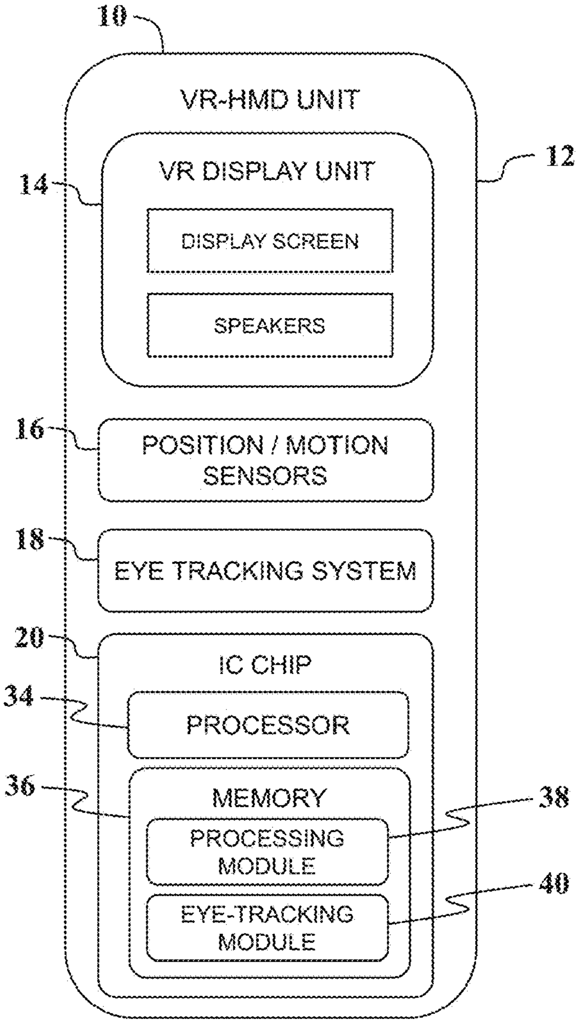
Figure 3:
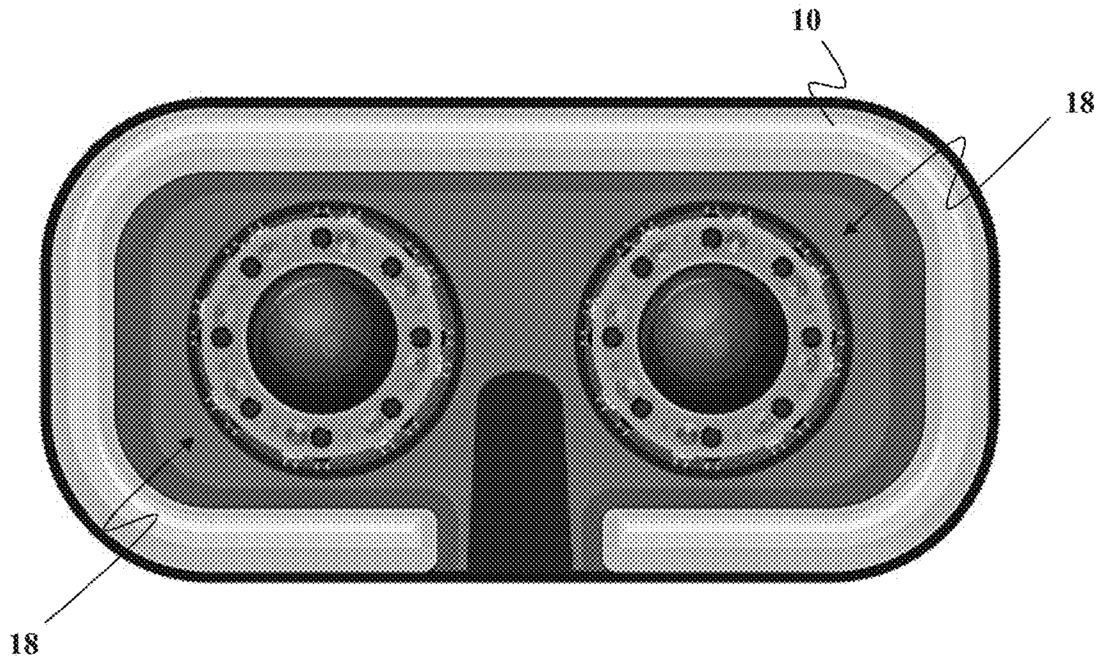
FIGS. 3 and 4 are partial perspective views of the head-mounted display unit including the eye tracking system shown in FIGS. 1-2.

With reference to the drawings and in operation, the embodiments of the present invention provide a system including head-mounted display (HMD) unit and an eye tracking system for use with HMD units. The system of the present invention solves the problem of providing zero-latency eye position data. The eye motion is registered using a set of simple photosensors that can measure changes in the intensity of the light coming from the infrared light sources. A precisely positioned set of sensors can deliver enough information about those changes to reconstruct eye position—this technique is called PSOG (photosensor oculography). The main advantage is that PSOG-based system requires only basic signal processing, and therefore, it can be implemented using the real-time embedded system, which provides sampling rate above 1 kHz with latency of below 1 ms. In comparison to the Video Oculography that inherently is prone to lower sampling rate and higher latency (beside bulky and high-end laboratory hardware like EyeLink 1000 Plus).

Extended Reality (XR) is an umbrella term that encompasses a wide range of immersive technologies, including Virtual Reality (VR), Augmented Reality (AR), and Mixed Reality (MR). These technologies blend the physical and digital worlds, creating interactive experiences that allow users to perceive and interact with digital content in new and innovative ways. Virtual Reality (VR) devices transport users into fully immersive, computer-generated environments, isolating them from the physical world. VR devices typically include head-mounted displays (HMDs), controllers, and sensors that track the user's movements and orientation, enabling them to explore and interact with the virtual environment. Key characteristics of VR devices include full immersion, high-quality graphics, and realistic simulations. VR has applications in various industries such as gaming, education, training, healthcare, and entertainment. Augmented Reality (AR) devices, on the other hand, overlay digital content onto the user's view of the physical world, enhancing their perception of reality. AR devices can range from smartphones with AR capabilities to dedicated headsets and glasses. Key characteristics of AR devices include real-time interaction, context-awareness, and seamless integration of digital and physical elements. AR has found applications in diverse fields such as navigation, retail, maintenance, and remote collaboration. Mixed Reality (MR) devices combine aspects of both VR and AR, allowing users to interact with digital content that is seamlessly integrated into their physical environment. MR devices typically include advanced HMDs, sensors, and cameras that track the user's position and orientation, as well as the environment itself. Key characteristics of MR devices include spatial awareness, real-world interaction with digital objects, and a blending of virtual and physical environments. MR has applications in various industries, including architecture, design, manufacturing, and healthcare. As XR technology continues to advance, the boundaries between VR, AR, and MR are becoming increasingly blurred, leading to the development of hybrid devices that offer a range of immersive experiences. Photosensor Oculography (PSOG), a technology that utilizes photosensors to detect eye movements and pupil position, can be implemented in any kind of Extended Reality (XR) device, including Virtual Reality (VR), Augmented Reality (AR), and Mixed Reality (MR) devices.

In one embodiment, the present invention includes augmented reality glasses including a lightweight frame configured to be worn on a user's head, wherein the frame includes adjustable nose pads and soft-touch temples for a customized and comfortable fit. The glasses further comprise a display system integrated into the frame, wherein the display system may employ various image projecting technologies such as micro-OLED, micro-LED, or MEMS projector, configured to project digital information onto the user's field of view with high resolution and vibrant colors. A photosensor oculography (PSOG) module is disposed within the frame, comprising a plurality of photosensors configured to detect eye movements and pupil position of the user. The PSOG module is operatively connected to a processing unit, which is configured to interpret eye movement data captured by the photosensors, enabling the user to interact with and control the digital information displayed by the augmented reality glasses through eye movements alone.

The eye tracking system includes a number of photosensors and light emitters (e.g., NIR) placed at specific points, e.g., around a lens or see-through display placed in HMD (one eye tracking set per one eye). The light source illuminates the area of the eye in a variable mode, turning on and off specific diodes alternately, creating repetitive lighting patterns generated at high time frequency. This method improves data quality. Photosensors detect the intensity of light (e.g., NIR) reflected from the eye surface. Changing the eye alignment influence a change of light intensities registered on photosensors configured to monitor selected eye regions. Based on this rule, system calculates gaze direction. Variable temperature in HMD's interior can affect the photosensors readings, therefore additional techniques for temperature compensation based on temperature measurements are applied. Moreover, as this technique itself is not resistant against the shift of HMD in relation to head, the proposed system may be also combined with an additional optical sensor configured to monitor relative position between the headset and user's face. For this purpose, eye tracking system may use also data collected by accelerometer or gyroscope modules built-in HMD. This input is then used to compensate occurred shifts or force re-calibration procedure. The sensor can be placed in the fabric that touches the user's skin. The sensor can operate without contact with the skin, placed approximately 1-3 mm away. The combination of photosensor temperature drift compensation and head-movement detection techniques creates a novelty in eye tracking industry.

Variability of the temperature in the interior of HMD causes the lagged temperature changes of photosensor. Specifically, shortly after mounting the HMD, the interior temperature can raise gradually and non-linearly from the room temperature to up to 20° C. above the initial temperature. On the other hand, dismounting the HMD effects in rapid temperature drop. The final temperature is affected by the skin temperature, heat emitted by the electronics and lack of the air circulation. Taking into account the operation theory of photosensor, it is well known that the sensor temperature affects non-linearly measurement of light intensity. Compensation model arises directly from the photosensors theory of operation and relies only on photosensor temperature measurement. Moreover, in the compensation procedure a heat transfer between photosensor and HMD interior need to be taken into account by heat transfer equations. In most simplest form the heat transfer can be expressed accurately enough with usage of just one coefficient, that need to be estimate for concrete incarnation of the HMD.

The flagship application for the eye tracking module built-in mobile HMD is a technique called foveated rendering. This term means the ability of the system to focus its own resources on high quality rendering of the virtual environment in accordance to the gaze direction. Simultaneously, the virtual projection quality is reduced for peripheral areas beyond the focus area (e.g., lower resolution visible peripherally visible as blurred image). What is important here is the balance between the resources allocated to the eye tracking and the savings associated with peripheral image degradation. This solution saves a significant amount of available resources in this context and can significantly improve the user experience (by for example higher frame-rate or more detailed rendering using the same hardware).

Calibration procedure is a necessary step that aims to find a relation between light intensity changes and eye movements. In the simplest embodiment calibration step consist of presenting on HMD at least three points with instructions to fixate on those. Recorded data are used to calculate relation between photosensors readings and eye gaze location. This relation can be expressed in one of the form: 1) set of mathematical equations, or 2) internal machine learning algorithm data.

Eye tracking of presented kind is an excellent tool for applications where moderate tracking accuracy (~1-2 degree) is good enough to achieve the content and/or business objectives. Nevertheless, the majority of applications related to the mass market of B2C and B2B do not require more precision.

One example is the analysis of the user's attention in relation to the elements embedded in the virtual environment of an advertising or marketing nature (e.g., advertising banners placed inside the game). Another example related to this field may be the analysis of attention in virtual store interiors available as 3D space imitating a real shopping experience.

Moreover, the proposed solution will significantly simplify the user interface navigation designed for 3D environments. Selecting action buttons or other objects with the use of eyesight allows to reduce the number of unnecessary actions such as clicks on a handheld controller. In this case, active objects such as buttons, links, images, etc. may support the virtual cursor snap that is controlled by gaze direction. An important improvement is also the implementation of simple gestures controlled by a specific eye movement or blink. The system can detect gestures such as: look left, look right, look down, look up, blink once, blink twice, blink only one eye. These types of gestures are extremely useful in immersive content that supports this type of navigation (e.g., scrolling, rotating an object, closing a window, undo, redo). This example brings a huge improvement in usability and user experience.

An interesting implementation of presented eye tracking is improved human communication done through virtual environments generated in HMDs. Virtual meetings of avatars can be enhanced by transferring real eye movements into rendered avatar's eyes. In this way, social interactions will become more natural, better reflecting the reality.

It is also worth to highlight one of the most popular VR/AR/MR content groups: games and entertainment apps. An additional method of interaction based on the gaze direction means a great enhancement for game scenarios and mechanics. Game designers will be able to develop games that use gaze direction to control, aim, catch, mark and execute many other useful actions.

Referring to FIGS. 1-11, in the illustrated embodiment, the present invention includes including a virtual reality head mounted display (VR-HMD) unit 10. The VR-HMD unit 10 includes a plurality of components contained with a housing 12. The components include, but are not limited to, a VR display unit 14, a sensor group 16, an eye tracking system 18, and a controller 20. The VR display unit 14 includes a VR display screen and one or more integrated speakers for rendering a virtual reality scene. The sensor group 16 includes one or more position/motion sensors for sensing a movement and/or orientation of the VR-HMD unit 10. The position/motion sensors may include, but are not limited to, accelerometer sensors, gyro sensors, and/or proximity sensors configured to sense movement, orientation, and/or direction of the VR-HMD unit 10.

The controller 20 includes an integrated circuit (IC) chip that is coupled to the VR display unit 14, sensor group 16, and eye tracking system 18. The IC chip includes a processor that is programmed to operate the eye tracking system 18, sensor group 16, and VR display unit 14 to display the virtual reality scene based on information received from the sensor group 16 and eye tracking system 18. The controller 20 may include a SoC chip built into the VR-HMD unit 10 for rendering a VR scene using the VR display screen.

The VR-HMD unit 10 may also include a communications device for use in communicating between the VR display unit 14 and an external computing device such as, for example, a hand-held control device, server computer, and/or a user computing device. The user computing devices may include, but is not limited to, a desktop computer, a laptop or notebook computer, a tablet computer, smartphone/tablet computer hybrid, a personal data assistant, a handheld mobile device including a smartphone, and the like. The communications device may include a Wi-Fi antenna, a cellular network antenna, a Bluetooth™ communications device, a wired communications port, and/or any suitable wired and/or wireless communications device to facilitate communications with the hand-held control device, server computer, and/or user computing devices.

VR-HMD unit 10 may support 5G wireless network which could enable to using external computing power support that will execute computer power demanding tasks outside the HMD.

The eye tracking system 18 includes one or more eye tracking assemblies 22 that include a support frame 24, one or more light emitters 26 mounted to the support frame 24, one or more photosensors 28 mounted to the support frame 24, and one or more temperature sensors 30 (e.g., thermistors) mounted to the support frame 24. Each photosensor 28 is positioned with respect to a corresponding light emitter 26. The light emitter 26 may include, for example, an IR emitter and/or an incandescent light source. The photosensor 28 may include, for example, a narrow-angle photosensor and/or photodiode. In some embodiments, the eye tracking system 18 includes a pair of eye tracking assemblies 22 with each eye tracking assembly 22 being associated with a corresponding eye of the patient.

In the illustrated embodiment, the thermistor 30 is coupled to the controller 20 and is configured to measure the temperature of the interior of the VR-HMD 10. The temperature in the interior of the HMD 10 is variable during the usage of HMD (e.g., the interior temperature may rise even by 10-15° C. within minutes when the HMD is mounted by the user, or the interior temperature may drop very fast to the exterior ambient temperature during dismounting the HMD from the user's head). It is well-known from the theory of operation of the photosensors that its temperature affects the reading, and the temperature of interior of HDM affects greatly the temperature of photosensors. This phenomenon introduces a specific error in photosensor reading (the drift error, that rises the reading non-linearly over time). By including the thermistor 30 to sense the interior temperature of the VR-HMD 10 and incorporating the sensed temperature reading into the photosensor-based eye tracking system 18, the eye tracking system 18 significantly reduces the error of estimating the gaze position.

In the illustrated embodiment, the eye tracking system 18 is configured to implement Photosensor Oculography (PSOG) which includes an eye-tracking technique based on the principle of using simple photosensors to measure the amount of reflected light when the eye rotates. PSOG can provide measurements with sufficient precision, low latency, and reduced power consumption, and thus it appears as an attractive option for performing eye-tracking in the emerging head-mounted interaction devices, e.g., virtual and augmented reality (VR/AR) headsets.

Figure 8:
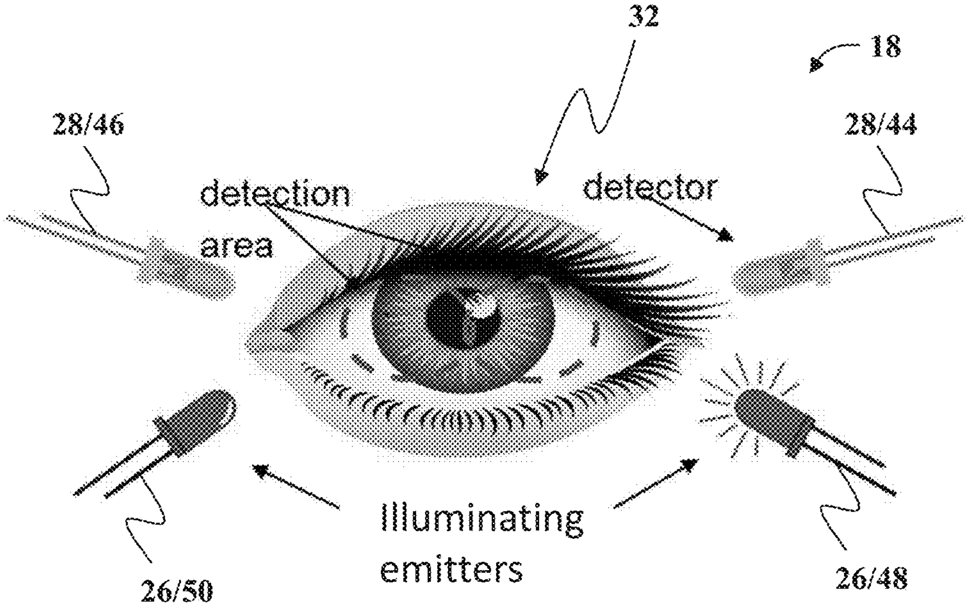
FIGS. 8-10 illustrate various operational modes of the system shown in FIGS. 1-2.

For example, as shown in FIG. 8 the eye tracking system 18 includes incandescent light source (emitters) that illuminate the eye and a narrow-angle photosensor detects the intensity of reflected light in a specified and precisely chosen area. In some embodiments, predefined subsets of the emitters alternately illuminate the eye forming (Illumination setup A and Illumination setup B). Illumination Setups differ by angle of illumination and/or wavelength of light (800 nm-900 nm).

The eye tracking system 18 is composed of a plurality of light sources, and a plurality of photosensors (PS). Data from PS are acquired using ADC (analog-to-digital) converters with additional operational amplifiers. The embedded microprocessor (EM) is responsible for communication with ADC's and turning switching illumination setup. EM also calculates the eye position using a set of polynomial equations that map the PS readings into eye position. Coefficients of equations are determined by the calibration procedure. The eye tracking system 18 is integrated with a head-mounted display and eye-tracking is limited to register gaze trajectory over the display.

Figure 6:
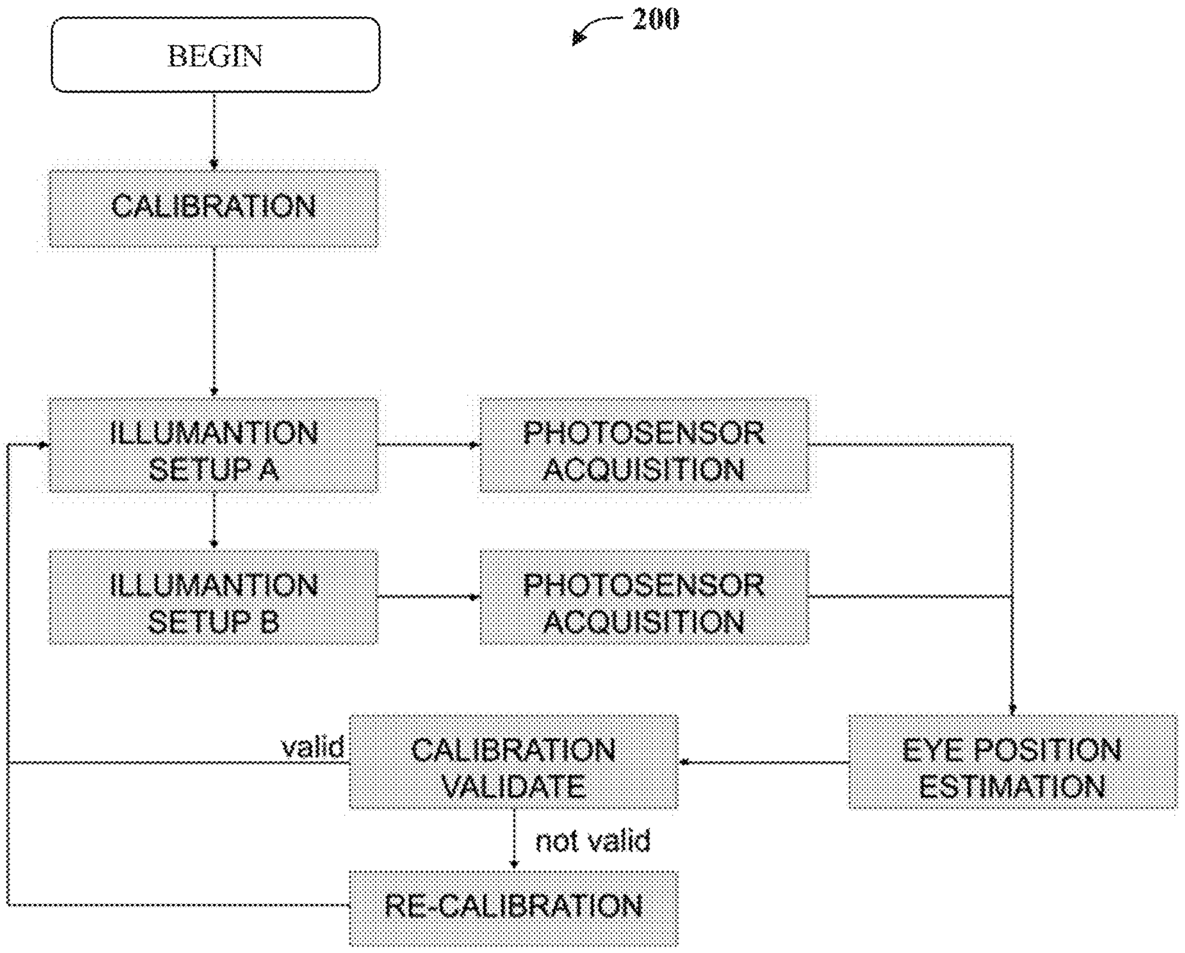
FIGS. 6 and 7 are flowcharts illustrating algorithms that may be executed by the system shown in FIGS. 1-2.

FIG. 6 illustrates an operational diagram illustrating algorithms 200 executed by the controller 20 to operate the eye tracking system 18. In the illustrated embodiment, the calibration procedure (determining the coefficient of the set of polynomial equations) is performed at system initialization. Equally distributed grid of points (between 5 to 15 points are used) is presented as a calibration target. During operation, illumination is switched between setup A and B, while the PS's are acquiring intensity at predefined areas. Eye position estimation is performed at EM. The additional calibration validation procedure is performed in the next step, indicating if additional recalibration is needed.

Re-calibration is needed if the shift between head-mounted display and the eye will occur. Such a situation can be detected by one of the methods: 1) User input, 2) Rapid movement detection using accelerometer sensors; 3) Additional optical-based sensor detect movement between the head mounted display and the skin; 4) The head-mounted display application indicates a problem; and 5) center of fixational probability map shift.

Re-calibration is a simplified process of calibration that modifies the calibration data using to account for the head-headset shift using one of the means: 1) presenting simplified calibration pattern, 2) using the rough or exact headset-head displacement vector, 3) using VR application data (e.g., known locations of application stimulus).

Figure 9:
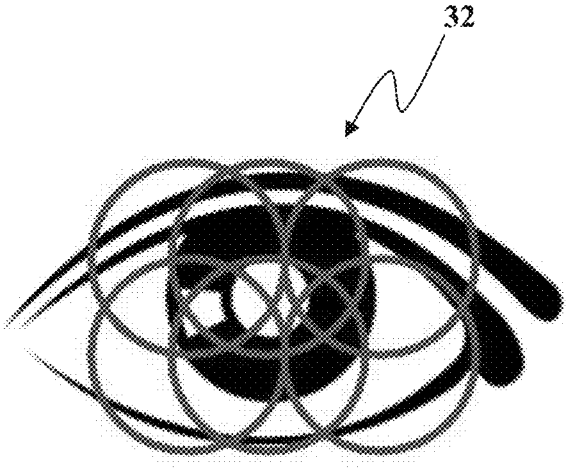

FIG. 9 illustrates one possible detection area arrangement of 6 photosensors. The detection area overlaps by 40% of neighboring area.

The present invention improves existing eye tracking technologies by including: 1) Low-cost BOM and easy mounting; 2) Computing power efficiency; 3) Energy efficiency; 4) Heat emission; and 5) Total weight.

The present invention is far more superior in comparison to any kind of market available products, and achieve accuracy ~1°. In comparison to existing PSOG (photosensor oculography) solutions provided by the present invention implement a few novel features/approaches, including: 1) Shift problem—PSOG is very sensitive to displacements of the headset position in relation to the head. Additional optoelectronic sensor that is capable of detecting movements between the HMD and the skin may be implemented (technical solutions can be adopted from optical mouse that is able to calculate movement on various surfaces using special purpose image-processing chips). The optoelectronic sensor can be mounted in foam that ensures head set to skin adjacency; 2) To increase data volume and tracking quality, the system may use sequential switching of IR emitters (possibly using different wavelength which influences amount of light reflected from pupil) that illuminates the eye area in variable lighting patterns (instead of all emitters constantly active); 3) re-calibration procedure that simplifies the process of recovering the eye tracking module after detection of headset-head shift; and 4) temperature compensation, that minimizes the drift error in intensity measurements on individual photosensors (since this phenomenon is easily misinterpreted as head-shift error in photosensor—based eye-tracking devices, in our case it significantly improves the tracking accuracy).

The eye tracking system described herein is AR, MR and VR ready.

Figure 11:
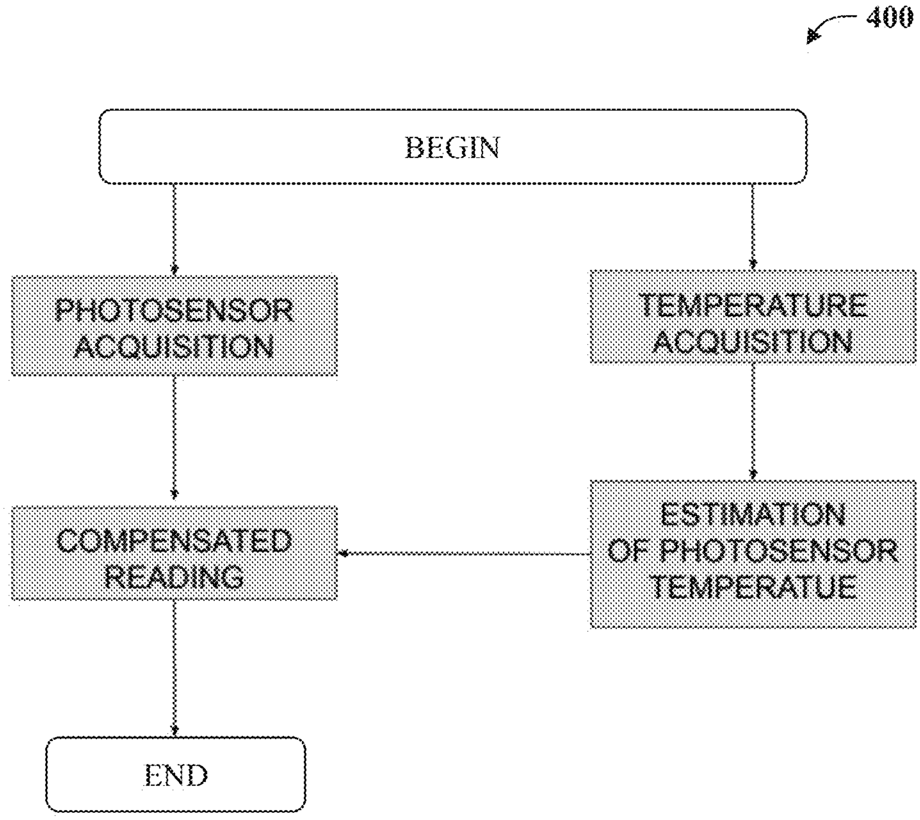
FIG. 11 is a flowchart illustrating algorithms that may be executed by the system shown in FIGS. 1-2.
Figure 12:
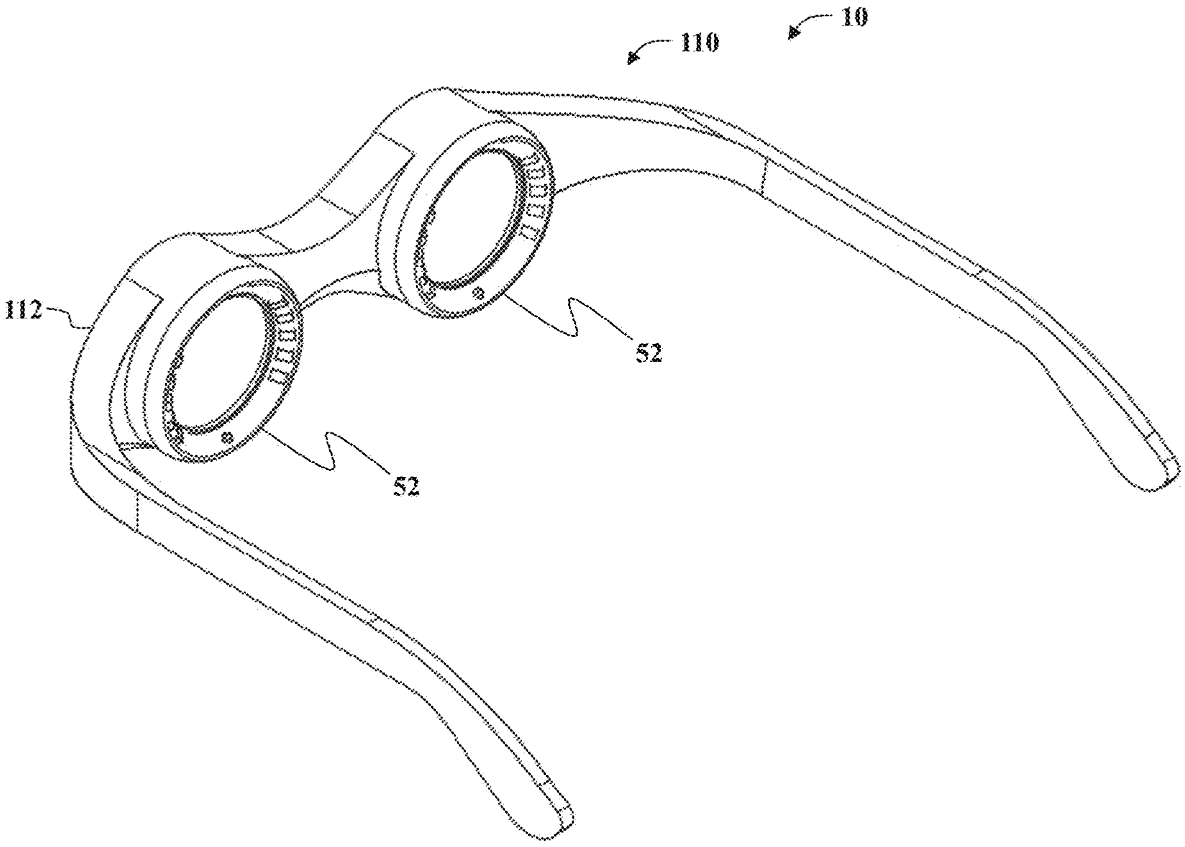
FIGS. 12-21 are perspective views of a VR/AR-HMD unit including PSOG assemblies the eye tracking system and pancake lens module, according to embodiments of the present invention.
Figure 13:
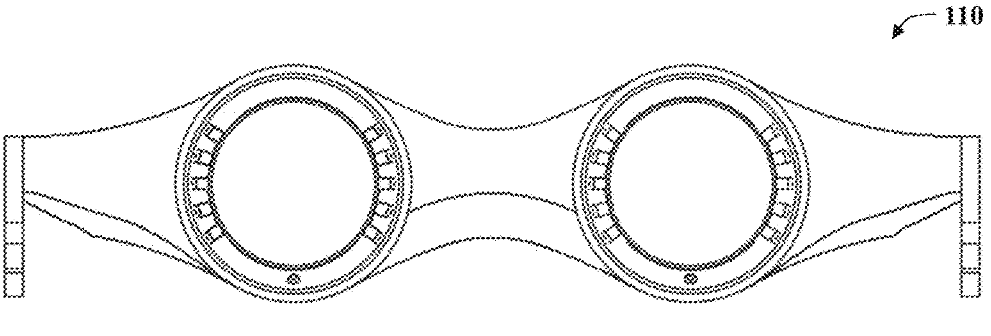
Figure 14:
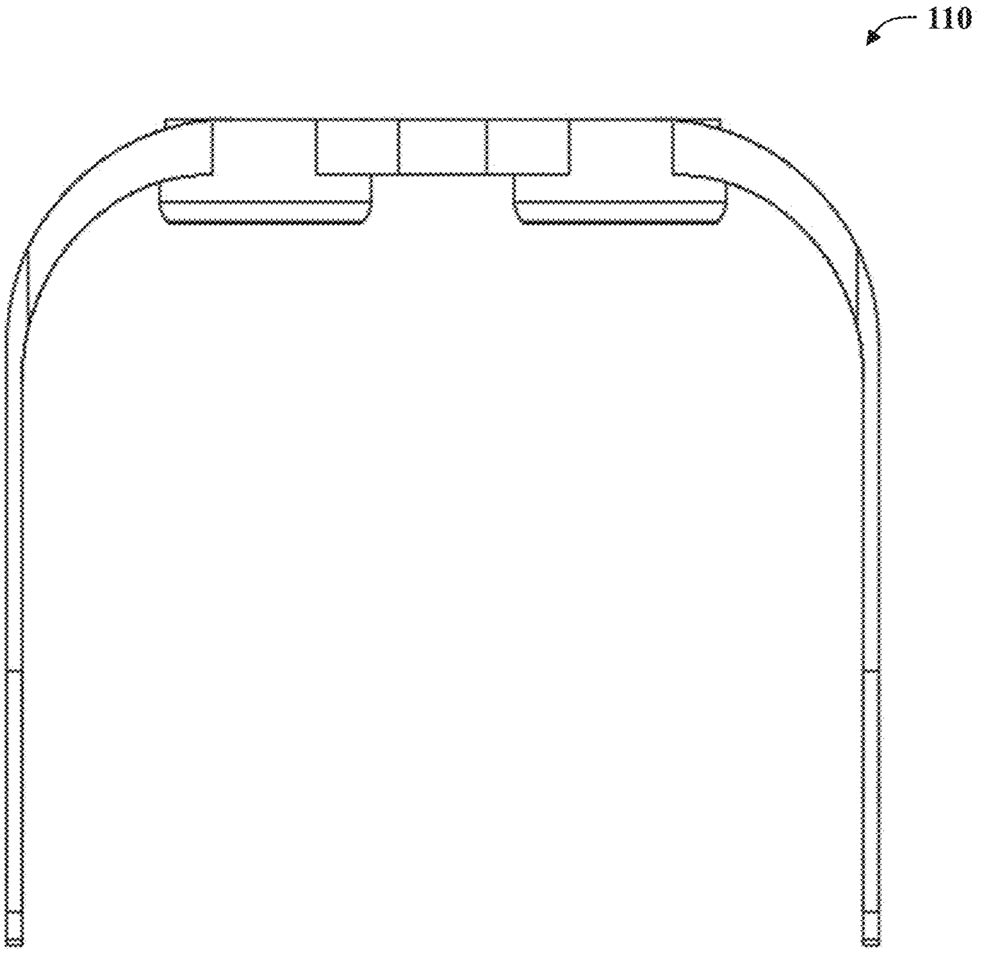
Figure 15:
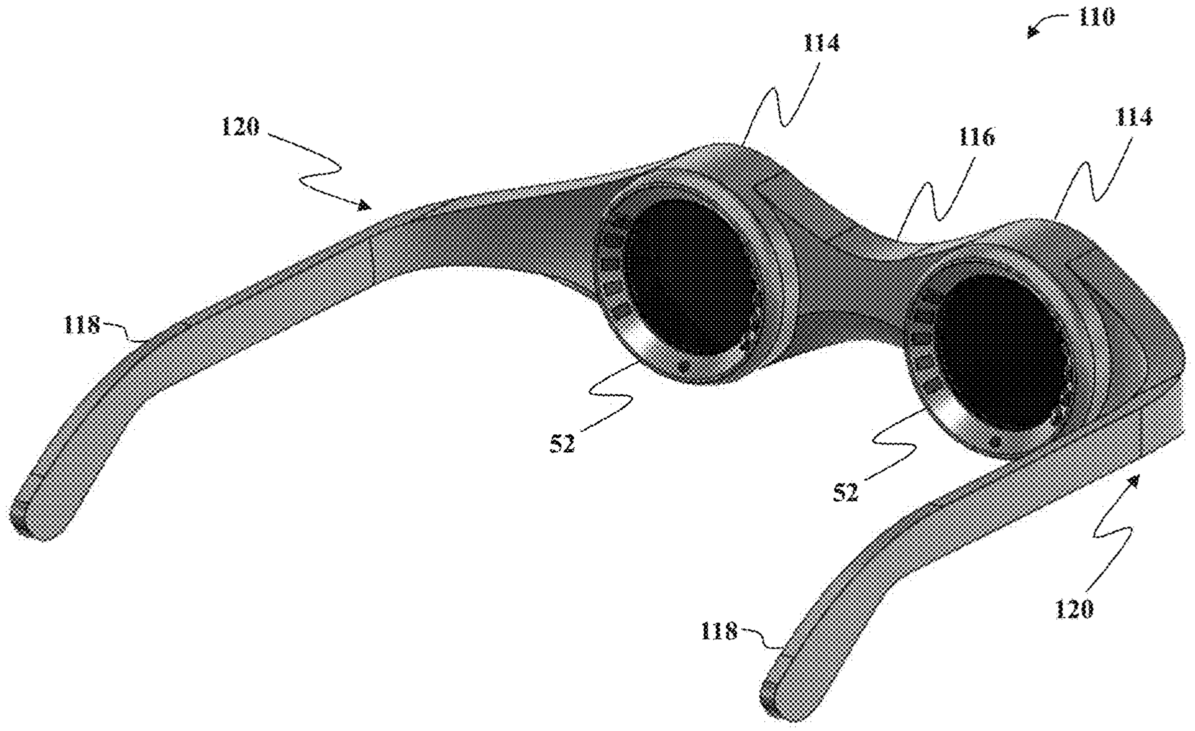
Figure 16:
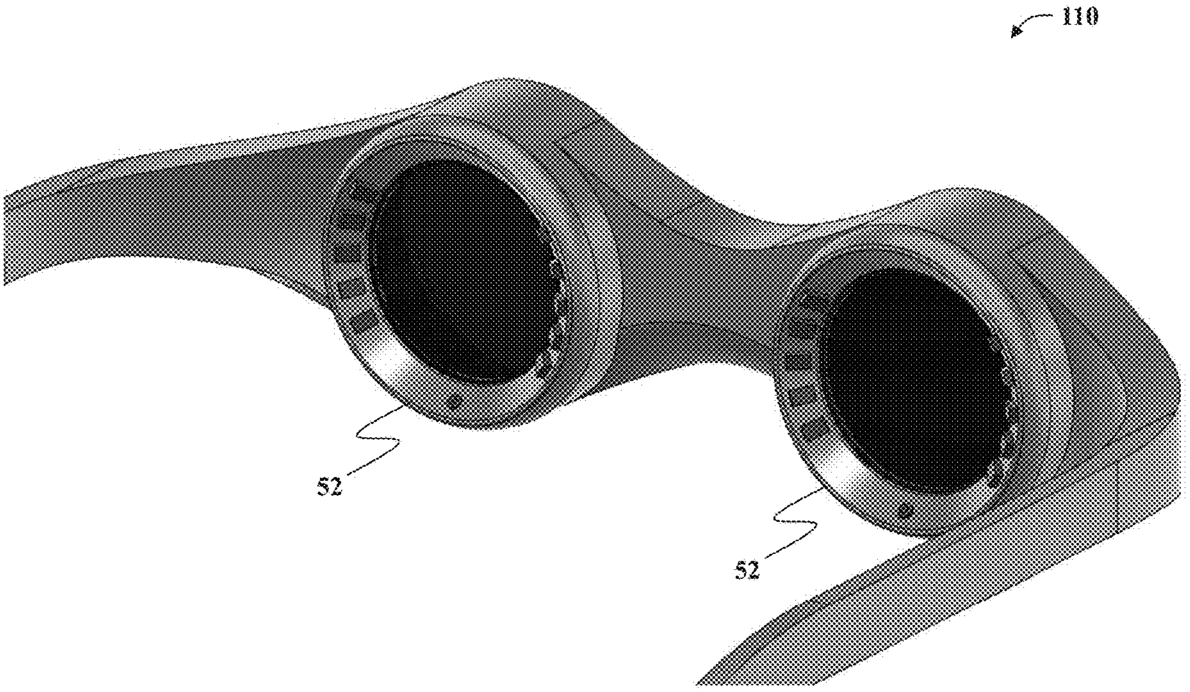
Figure 17:
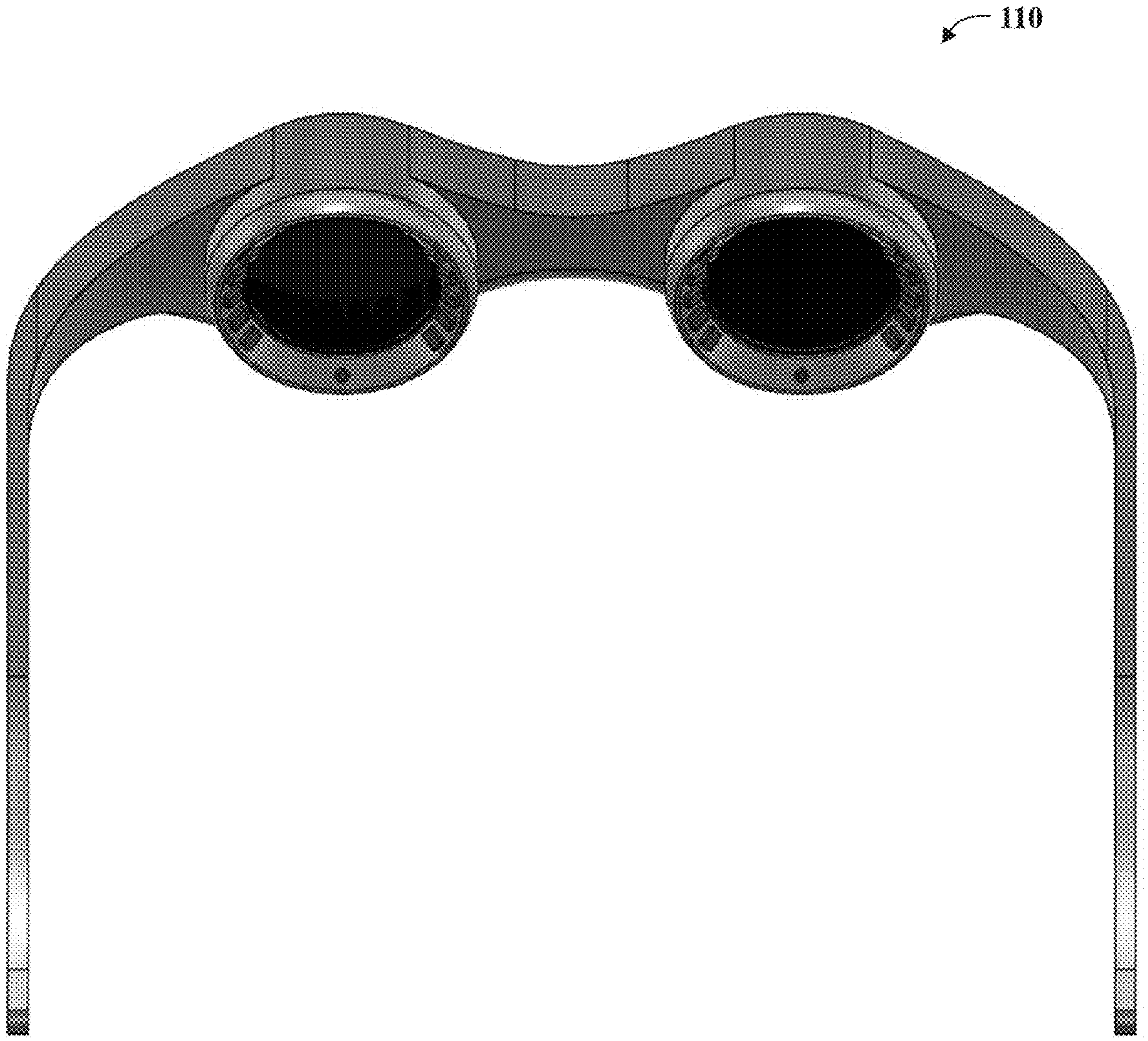
Figure 18:
Figure 19:
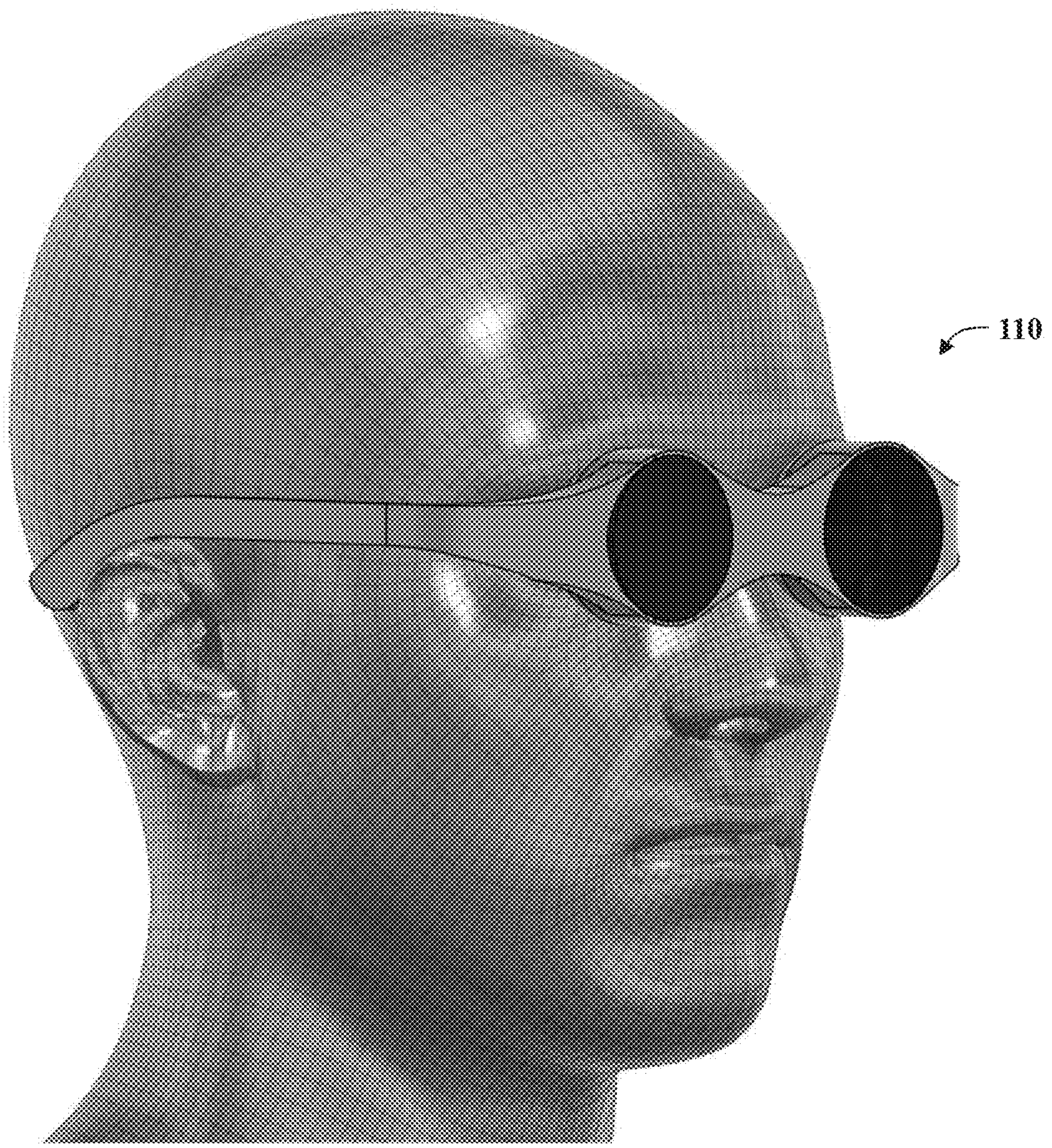
Figure 20:
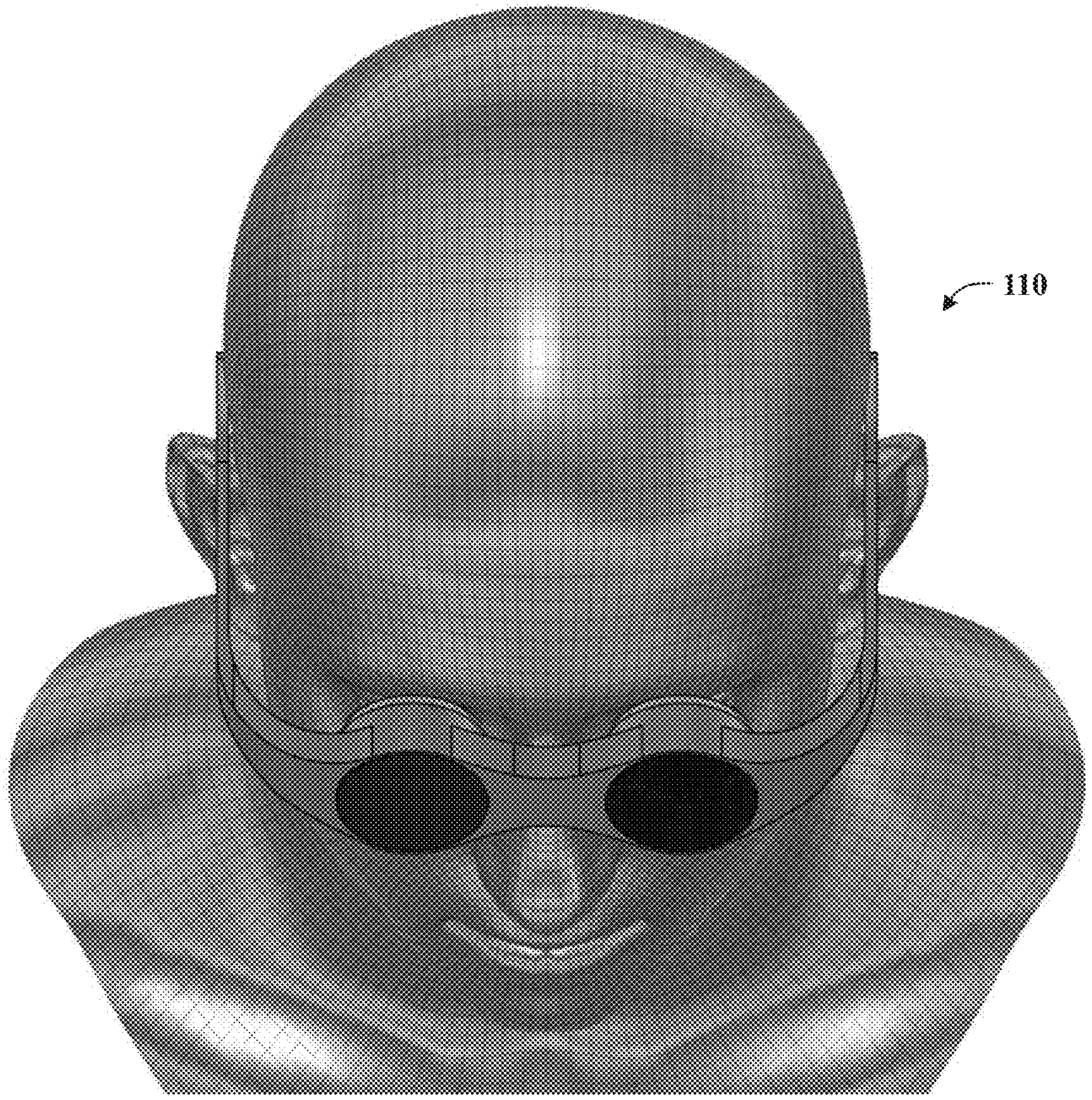
Figure 21:
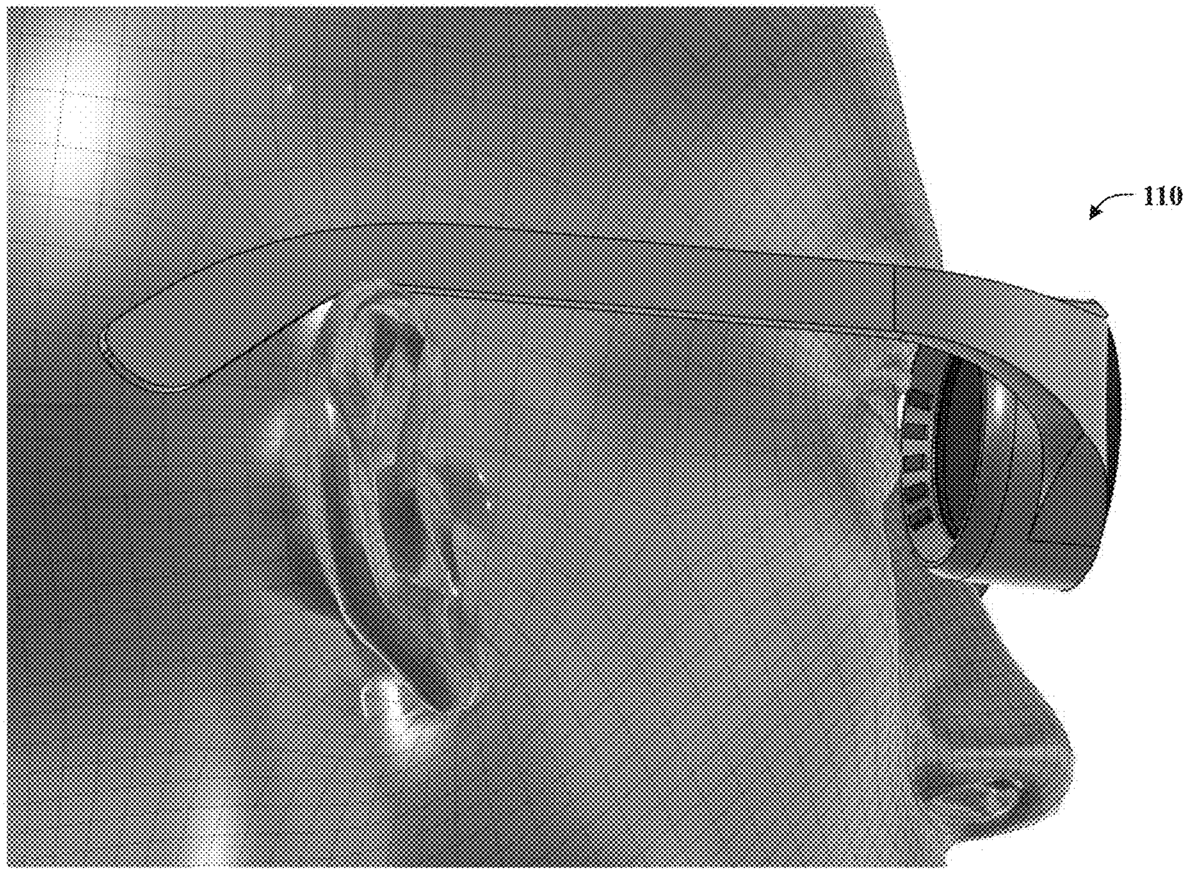

FIG. 11 is a flowchart illustrating algorithms 400 that may be executed by the controller for operating the eye tracking system 18 to include temperature compensation for the photosensor readings. For illumination measurement using a single photosensor, following procedure is exploited (as shown in FIG. 11). In the illustrated embodiment, photosensor and temperature reading is performed by the controller 20. The temperature measurement is used to estimate exact temperature of photosensor, using following heat transfer equation:

$$T_{ph}(i)=T_{ph}(i-i)+K\cdot(T(i-1)-T(i)) \qquad \text{Equation 1:}$$

Where: T(i) and Tph(i) is the i-th measured interior temperature and photosensor temperature, at the i-th time respectively; and K is heat transfer coefficient, estimated using separate calibration procedure for specific setup of HMD 10. This heat transfer formula is used because, temperature capacity of the thermistor 30 and photosensors 28 in most cases are significantly different.

Next, a photosensor reading is compensated using following formula, derived from modelling a photosensor as controlled current source connected in parallel to an exponential diode:

$$I_{compensated} = \frac{I_{measured}}{e^{T_{ph}\cdot\alpha}}. \qquad \text{Equation 2}$$

Where: Icompensated and Imeasured are illumination readings compensated and measured, respectively.

Figure 10:
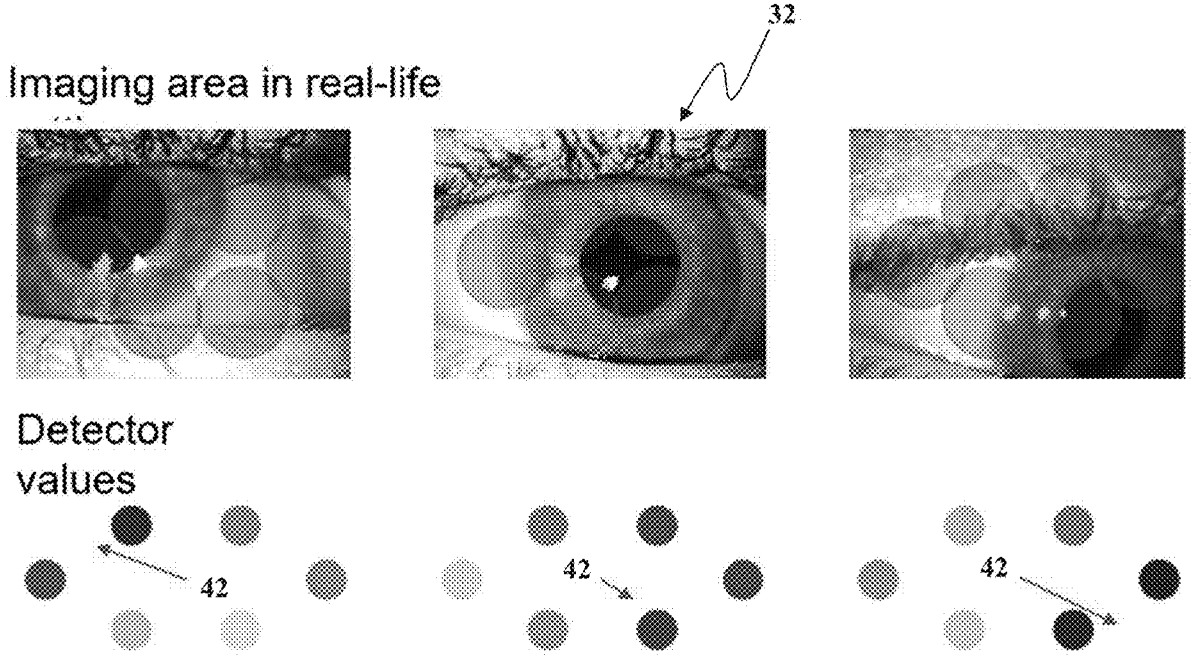

In some embodiments, the eye tracking system 18 is used with the HMD 10. The eye tracking system 18 includes a light source 26 that is configured to illuminate an area of a patient's eye 32 of a patient, a plurality of photosensors 28 that are configured to receive reflection from different (possibly overlapping) parts of the illuminated eye 32 (as shown in FIGS. 9 and 10), and one or more temperature sensors 30 (e.g., thermistors) configured to measure a temperature of photosensors 28 and/or an interior temperature of the HMD 10. The eye tracking system 18 may also include the controller 20 having a processor 34 and memory device 36 coupled to the processor 34. The memory device 36 is a non-transitory computer-readable storage media having computer-executable instructions embodied thereon. The memory device 36 may include a processing module 38 and an eye tracking module 40. The processing module 38 includes computer-executable instructions that, when executed by the processor 34, cause the processor 34 to perform an algorithm including the step of compensating photosensors measurement error due to variable operating temperature in the HMD unit 10. The eye tracking module 40 includes computer-executable instructions that, when executed by the processor 34, cause the processor 34 to perform an algorithm including the step of determining the gaze position using a mapping between intensities 42 of photosensors 28 (shown in FIG. 10) and gaze position estimated during a calibration procedure. When performing mapping between intensities of photosensors 28 and gaze position estimated during a calibration procedure, the processor 34 may implement any suitable method that maps input vector of light intensities into 2-dimenisonal position of gaze that includes a machine learning (e.g., neural network, classification etc.) or simple interpolation of input values and 'closest value finding' or using a set of polynomial equations which coefficient are determined during the calibration procedure (as described above).

The processor 34 is further programmed to execute the algorithm steps including using the gaze estimation to adjust the display properties in HMD 10, adjust the rendering process for the HMD 10, perform an interaction with the user, and/or perform the IPD measurements basing on gaze properties.

The processor 34 may be further programmed to execute the algorithm steps including using the interior temperature measurement from the temperature sensor 30 to compensate the error of photosensor reading. For example, the processor 34 may use a heat transfer formula between interior of HMD 10 and photosensor 28 to estimate the temperature of photosensor, wherein coefficient of heat transfer formula is determined for specific incarnation of the HMD. The processing module 38 then causes the processor 34 to compensate a non-linear independence of photosensor reading with its temperature.

The processor 34 is further programmed to compensate the reading of photosensors for error connected with temperature variation in the HMD 10. The calibration data is acquired for the user by the processor 34 in which the fixation target is presented on the HMD 10 sequentially at multiple known locations and the light intensities gathered by photosensors are stored. The calibration data is used to construct a mapping between intensities values and gaze position in one of the following way: 1) calibration data is used to construct a mapping basing purely on reading of single user, or 2) general mapping is modified for selected user.

Figure 7:
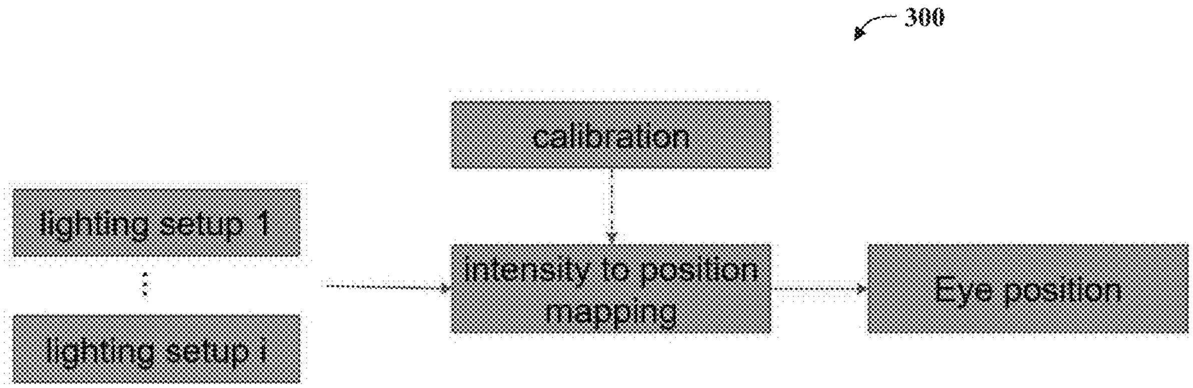

FIGS. 6, 7, and 11 are flow charts of methods 200, 300, and 400 illustrating the algorithms included in the memory device 36 and performed by the processor 34 when operating the HMD unit 10 and eye tracking system 18. The methods include a plurality of steps. Each method step may be performed independently of, or in combination with, other method steps. Portions of the methods may be performed by any one of, or any combination of, the components of the HMD unit 10.

Figure 4:
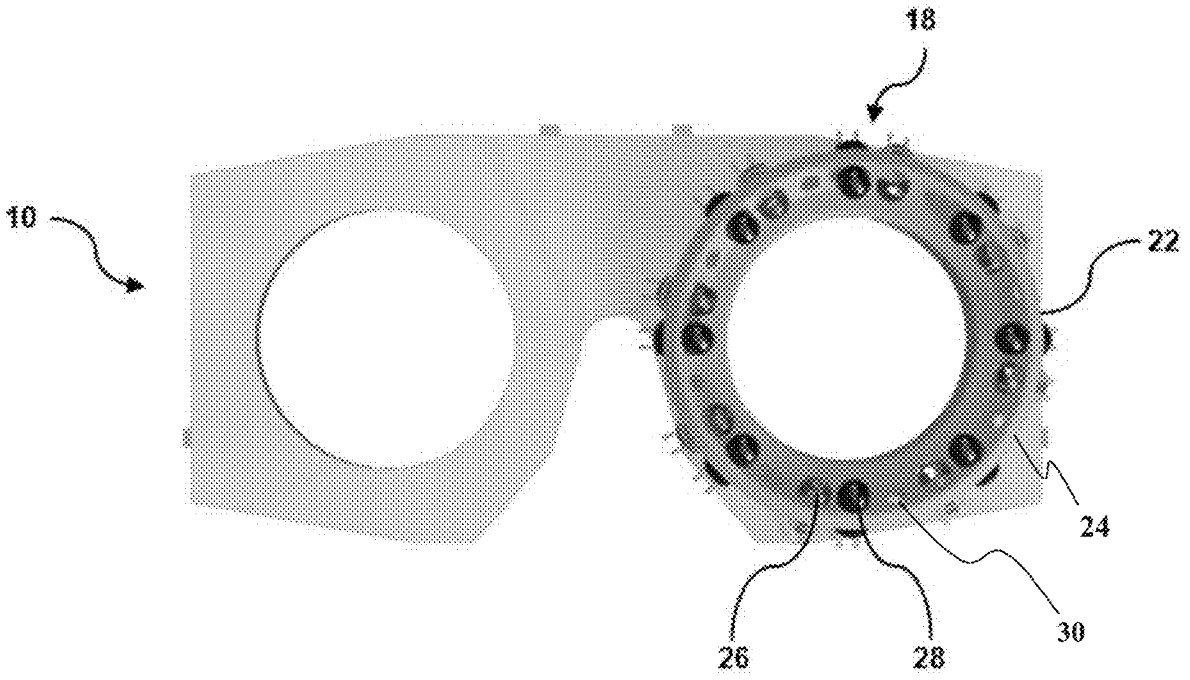
Figure 5A:
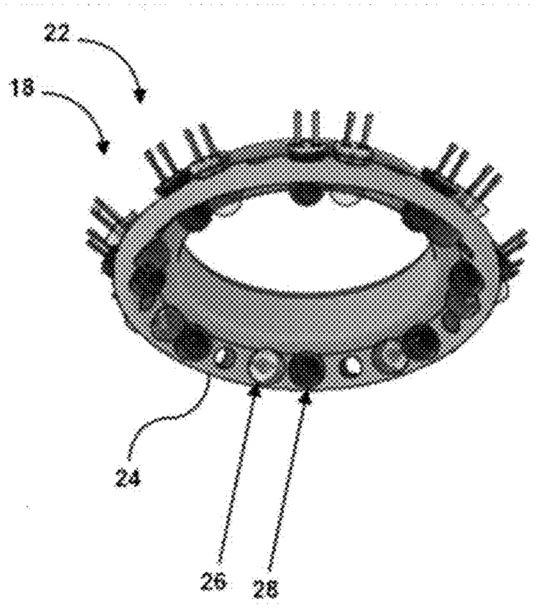
FIGS. 5A-5C are perspective views of the eye tracking system shown in FIGS. 3-4.
Figure 5B:
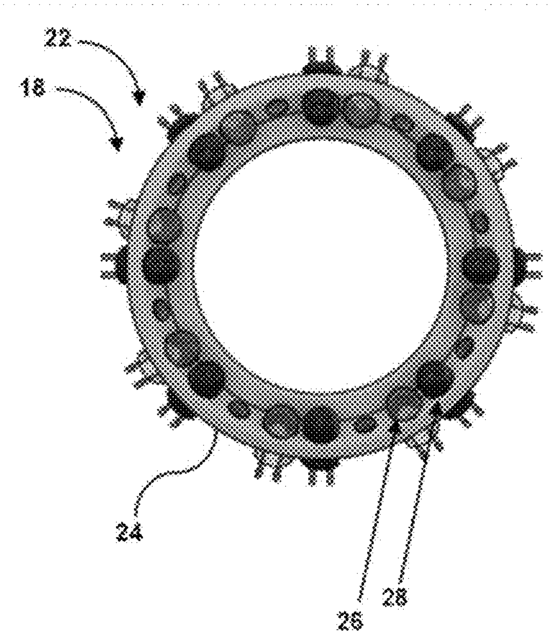
Figure 5C:
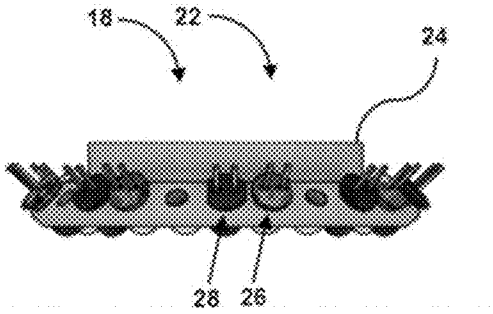

In the illustrated embodiment, the eye tracking system 18 includes the support frame 24 mounted to a housing of the HMD unit 10. A light source 26 is mounted to the support frame 24 and is configured to illuminate an area of a patient eye 32. The light source 26 may include a plurality of light emitters orientated about a perimeter of the patient's eye 32 (as shown in FIG. 4). A plurality of photosensors 28 are mounted to the support frame 24 and configured to receive reflected light from different portions of the illuminated patient eye 32. The plurality of photosensors 28 may be orientated about a perimeter of the patient's eye 32 (as shown in FIG. 4). One or more temperature sensors 30 are mounted to the support frame 24 and configured to measure a temperature of the photosensors 28. In some embodiments, a temperature sensor 30 may be positioned adjacent each corresponding photosensor 28. In other embodiments, a single temperature sensor 30 may be mounted to the support frame 24 and configured to sense an interior temperature of the HMD unit 10.

In the illustrated embodiment, the eye tracking system 18 includes a processor 34 that is programmed to execute the algorithms shown in methods 200, 300, and 400. For example, the processor 34 may be programmed to execute an algorithm including a processing module that compensates photosensor measurement error due to variable operating temperature in the HMD unit using method 400, and an eye-tracking module that determines a gaze position of the patient eye including a mapping between intensities of photosensors and a gaze position estimated during a calibration procedure using methods 200 and/or 300.

Figure 22:
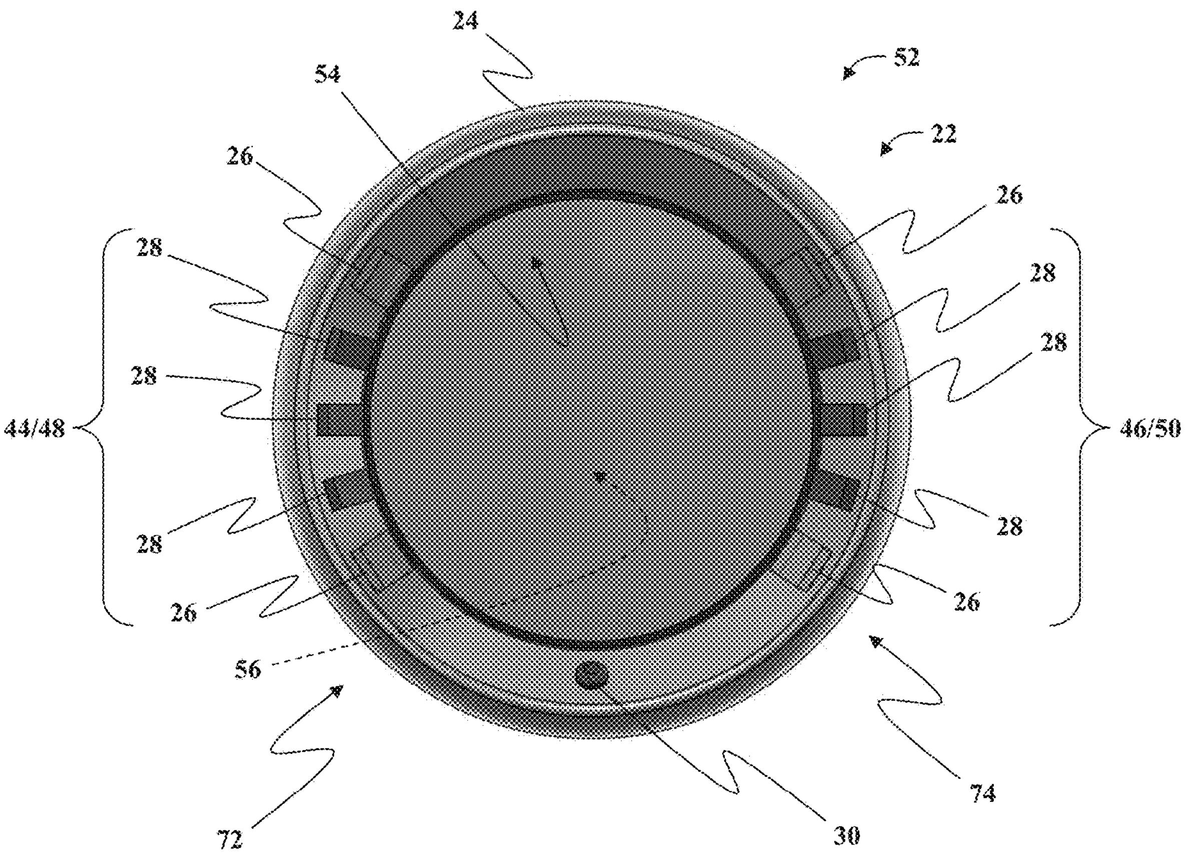
FIGS. 22-27 are perspective views of a PSOG assembly including an eye tracking assembly, pancake lens module, and a micro-OLED display.
Figure 23:
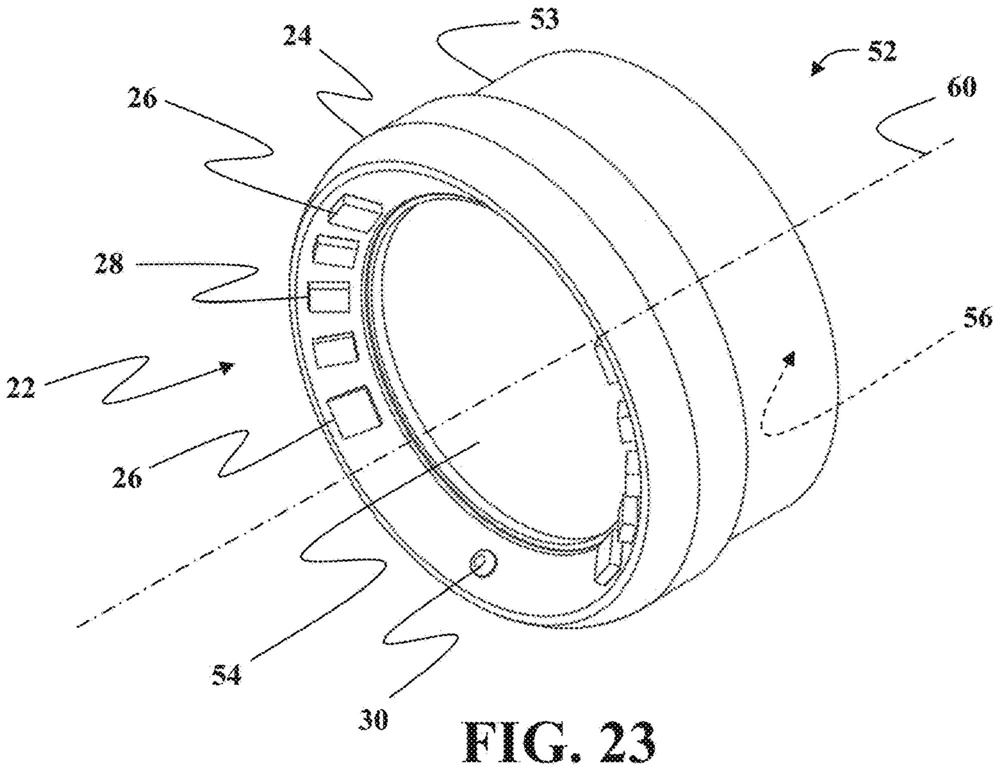
Figure 24:
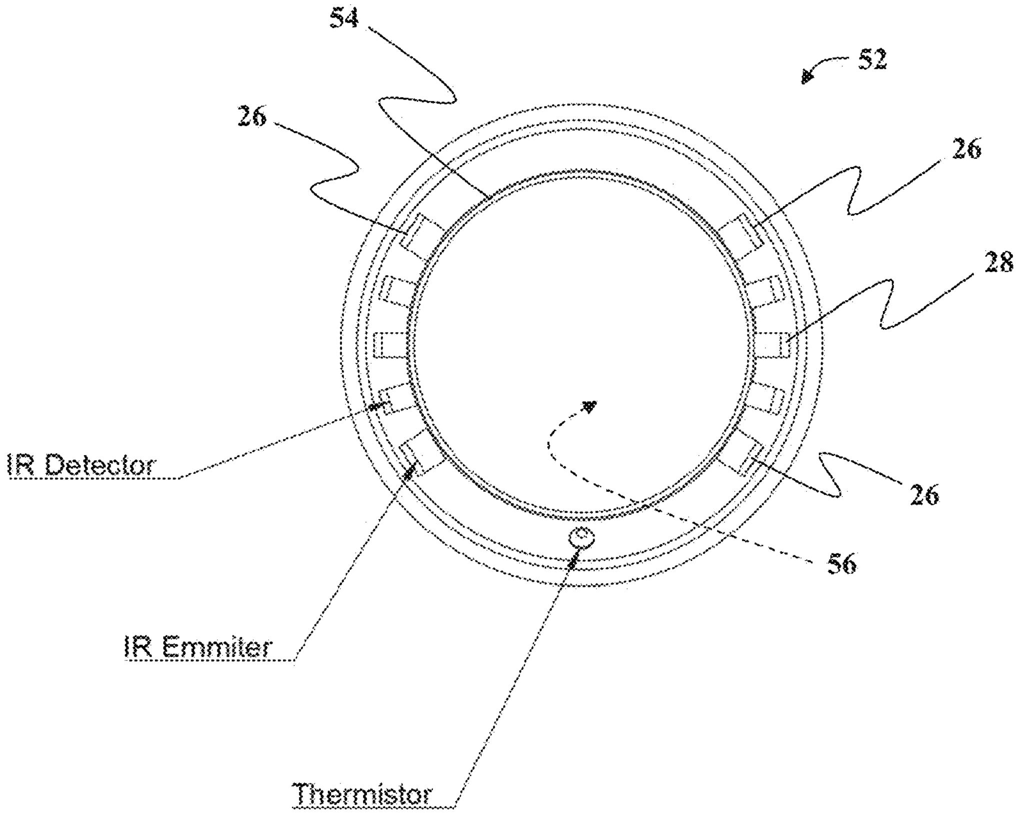

In some embodiments, the processor 34 is programmed to execute the algorithm including the steps of determining the gaze position of the patient eye 32 using the mapping between the intensities of photosensors that are compensated photosensor measurement errors due to variable operating temperature in the HMD unit and the estimated gaze position. The processor 34 may also be programmed to estimating inter-pupilar distance measurements based on the determined gaze position of the patient eye. In some embodiments, as shown in FIGS. 8 and 22, the processor 34 if programmed to operate the eye tracking system 18 including a first group 44 of photosensor 28 (e.g., Illumination setup A) and a second group 46 of photosensors 28 (e.g., Illumination setup B) that is orientated at different positions about the perimeter of the patient eye than the first group of photosensors 28. For example, in some embodiments the first and second groups of photosensors 28 include every other photosensor 28 such that the groups of photosensors 28 are arranged in an alternating arrangement about the perimeter of the patient's eye 32. In other embodiments, the first group of photosensors 28 may be orientated on one side of the patient's eye 32 with the second group of photosensors 28 oriented on the opposite side of the patient's eye 32. Similarly, the eye tracking system 18 may include a plurality of light emitters 26 arranged in a first group 48 of light emitters 26 corresponding with the first group of photosensors 28, and a second group 50 of light emitters 26 corresponding with the second group of photosensors 28.

In some embodiments, the processor 34 is programmed to alternate illumination between the first and second group of light emitters 26 and acquire data from the first and second groups of photosensors 28 using analog-to-digital converters with additional operational amplifiers. The processor 34 is programmed to communicate with analog-to-digital converters and alternating switching between groups of light emitters 26. The processor 34 then calculates the eye position using a set of polynomial equations that map the photosensors 28 readings into eye position.

In the illustrated embodiment, the processor 34 is also programmed to execute the algorithm including the steps of adjusting display properties of the HMD unit based on the determined gaze position of the patient eye, and adjusting a rendering process for the HMD unit based on the determined gaze position of the patient eye. For example, the processor 34 may be programmed to operate the HMD unit 10 using foveated rendering to display high quality rendering of images of the virtual environment on the HMD unit 10 in accordance to the gaze direction estimated by the processor 34.

The processor 34 may also be programmed to execute the algorithm including the steps of receiving an interior temperature measurement of the HMD unit from the temperature sensor, and compensating photosensor measurement error based on the received interior temperature measurement of the HMD unit. The processor 34 may also be programmed to execute the algorithm including the steps of compensating photosensor measurement error by calculating a heat transfer formula between an interior of the HMD unit and photosensors to estimate a temperature of photosensors, wherein the heat transfer formula includes a coefficient determined based on the HMD unit. In some embodiments, the processor 34 executes the processing module 38 to compensate a non-linear independence of photosensor reading with a temperature of a photosensor.

The processor 34 may also be programmed to execute the algorithm including the steps of compensating photosensor measurement error connected with a temperature variation in the HMD unit. The processor 34 is also programmed to execute the algorithm including the steps of performing the calibration procedure including acquiring calibration data by operating the HMD unit to present a fixation target sequentially at multiple known locations, and detecting and storing light intensities gathered by the photosensors during presentation of the fixation target. The processor 34 may also be programmed to execute the algorithm including the steps of constructing the mapping between intensities values and a gaze position by using the calibration data to construct a mapping basing purely on a reading of a single user, or a general mapping modified for a selected user.

Referring to FIGS. 12-27, in some embodiments, the HMD unit 10 includes an eye tracking system 18 based on Photosensor Oculography for VR/AR HMD in which usage of pancake lenses prohibits usage of classic approach with video oculography. Pancake optics require close distance to the eye which makes it unfeasible to mount hot mirrors and cameras. In addition, the goal of HMD based on pancake modules is to reduce the weight and size of the device. Therefore, a new approach to eye tracking is required. Here we present how to build eye tracking device for VR/AR based on pancake lens modules. Pancake lenses is colloquial term and denotes a flat thin lenses in which lens can be mounted in very short distance to display (so short that one cannot use a camera based eye-tracker). The Pancake optics working mechanism involves reflecting light back and forth within the optical system.

Photosensor Oculography (PSOG) is an eye-tracking technique based on the principle of using simple photosensors to measure the amount of reflected light when the eye rotates. PSOG can provide measurements with high precision, low latency, and reduced power consumption, and thus it appears as an attractive option for performing eye-tracking in the emerging head-mounted interaction devices, e.g. virtual and augmented reality (VR/AR) headsets.

In the illustrated embodiment, the HMD unit 10 includes a pair of PSOG assemblies 52 mounted to a wearable frame 12. FIGS. 12-21 illustrate an example of VR glasses with pancake lenses and micro-OLED display matched with PSOG assemblies 52. FIGS. 22-27 illustrate an example of a PSOG assembly 52 including a display housing 53 mounted with a pancake lens module and a micro-OLED display. Each PSOG assembly 52 includes an eye tracking assembly 22, a pancake lens module 54, and a micro-OLED display assembly 56. The eye tracking assembly 22 includes light emitters 26, photosensors 28, and one or more temperature sensors 30 mounted to a ring support frame 24. The pancake lens module 54 is positioned between the micro-OLED display assembly 56 and the eye tracking assembly 22.

During operation, an incandescent light source (e.g. light emitters 26) illuminate the eye. A narrow-angle photosensor 28 detects the intensity of reflected light in a specified and precisely chosen area. The eye position is determined by the relative or absolute intensity values on detectors (photosensors). Illumination Setups differ by angle of illumination and/or wavelength of light (800 nm-900 nm)

Determining the position of the eye is performed based on illumination intensity registered by photosensors, and it is absolute or relative values. Therefore, the controller 20 can understand a determining gaze position as a function that maps the intensity values from the plurality of photosensors values to 2D gaze position. Process of finding such a function (or map) is called calibration, in which the visual marker is shown on predefined positions and corresponding values are registered. Next a machine learning or any interpolation technique can be exploited by the controller 20 to find such function, that is later used for eye tracking.

The emitters 26 and detectors 28 are arranged around a pancake lens module 54. As shown in FIGS. 22-27, the PSOG assemblies 52 may include a left-right arrangement without top and bottom which works best for different face-shape of users. An optional thermistor 30 may be added for registering the temperature around photosensor to optionally perform temperature compensation.

Temperature Compensation. It is well known that varying temperature can affect the photosensor readings. In this embodiment, the PSOG assembly 52 includes a thermistor 30 that records the temperature and allows the controller 20 to compensate photosensor readings. The problem of temperature drift can be also solved using a re-calibration procedure started on-demand, however adding thermistor collected data to the analytical model makes possible to reduce the number of additional re-calibrations, which is important from the user experience point of view.

Limitations connected with headset-shift. One particular limitation is called headset-shift in which the precision of eye tracking goes down because of small shifts between the eyes and photosensors, in the result of head movement. In that case two solutions can be performed: 1) Re-calibration—starting the calibration procedure once again; 2) Correcting the previous calibration using reduced number of reference position of visual markers. 3) Correcting the previous calibration based on additional headset shift sensor (IR).

In some embodiments, the PSOG assembly 52 includes at least one infrared light source, at least two photosensors arranged around lenses, and a data processing module that perform acquisition data from photosensors.

The PSOG assembly 52 includes the usage of thin lenses (pancake) which makes prohibits usage of classic video based eye-tracking device.

The PSOG assembly 52 may optionally be equipped with temperature compensation module that includes a single thermistor mounted around each lens and a temperature compensation module, in which temperature data is used to discard varying temperature drift of photosensors.

The PSOG assembly 52 may also be adapted to allow the controller 20 to perform calibration that can be continuously corrected or updated during operation, by: 1) adding a new calibration point on demand by the user; and 2) automatically adding a new calibration point with supposed gaze location along with intensity readings.

In some embodiments, the HMD unit 10 includes a pair of PSOG assemblies 52 (one per eye), with each PSOG assembly 52 including an OLED on Silicone (OLEDoS) display module, a pancake lens optical module, and an eye tracking assembly 22 mounted around the pancake lens optical module. The eye tracking assembly 22 includes at least one infrared light source, at least two photosensors arranged around lenses, and a data processing module that perform acquisition data from photosensors. The eye tracking assembly 22 may also be mounted on pancake lens module and includes two optoelectronic sets, each combined of at least one infrared light source and at least one photosensor, placed on opposite sides of the ring support.

In the illustrated embodiment, as shown in FIGS. 12-27, the HMD unit 10 includes a virtual reality (VR) wearable assembly 110 that includes a wearable frame 112 adapted to be worn over a patient's eyes and a pair of PSOG assemblies 52 that are mounted to the wearable frame 112 such that each PSOG assembly 52 is positioned adjacent a corresponding eye of the patient. For example, in some embodiments, the wearable frame 112 is similar to an eye glasses frame and includes a pair or rims 114 coupled to a bridge 116 and a pair of temple assemblies 118 hingedly coupled to opposing rims 114 via hinge assemblies 120.

Figure 25:
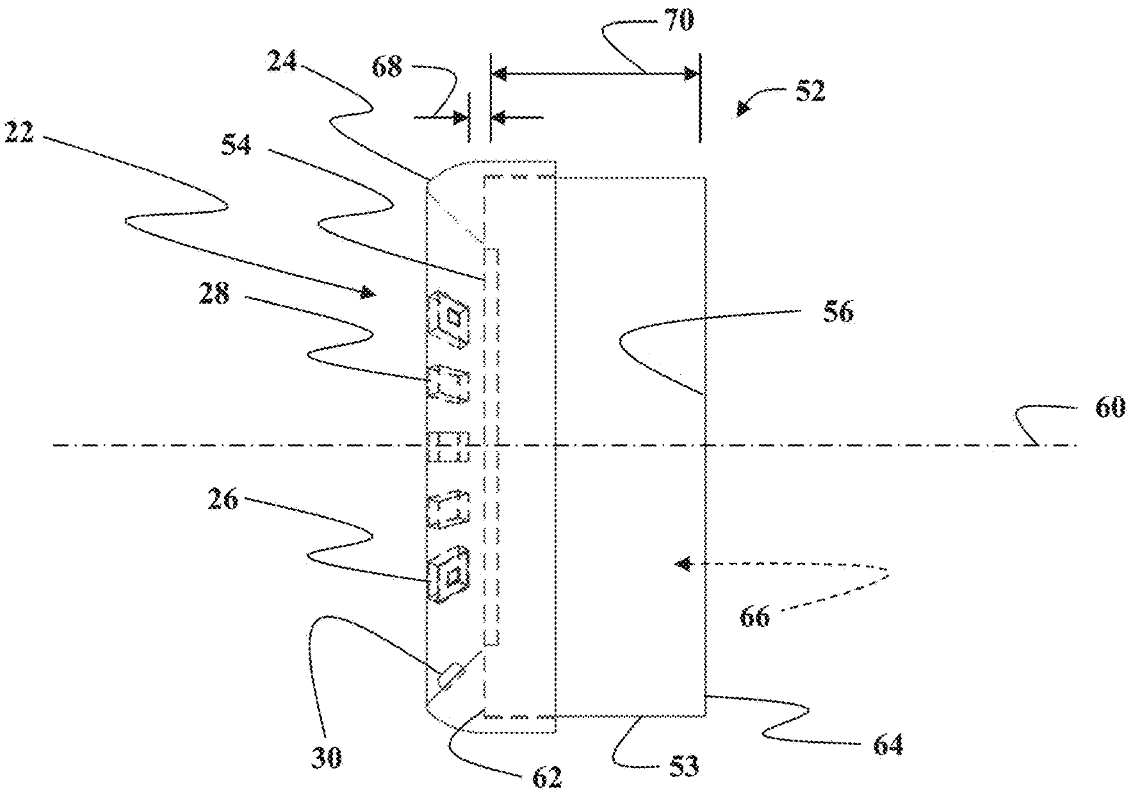
Figure 26:
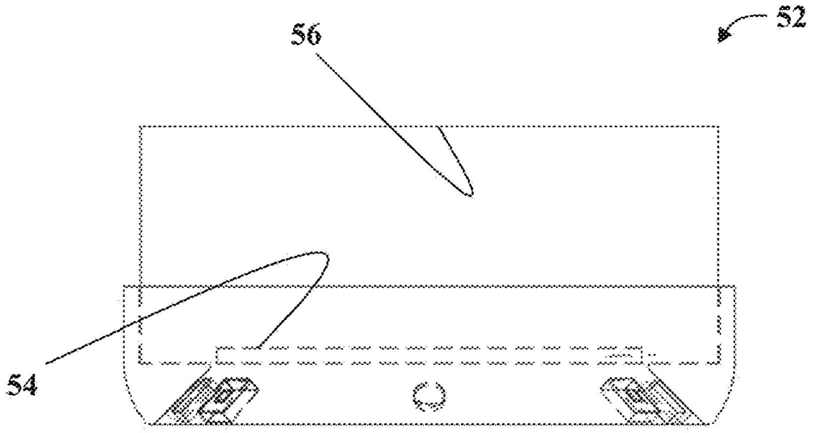
Figure 27:
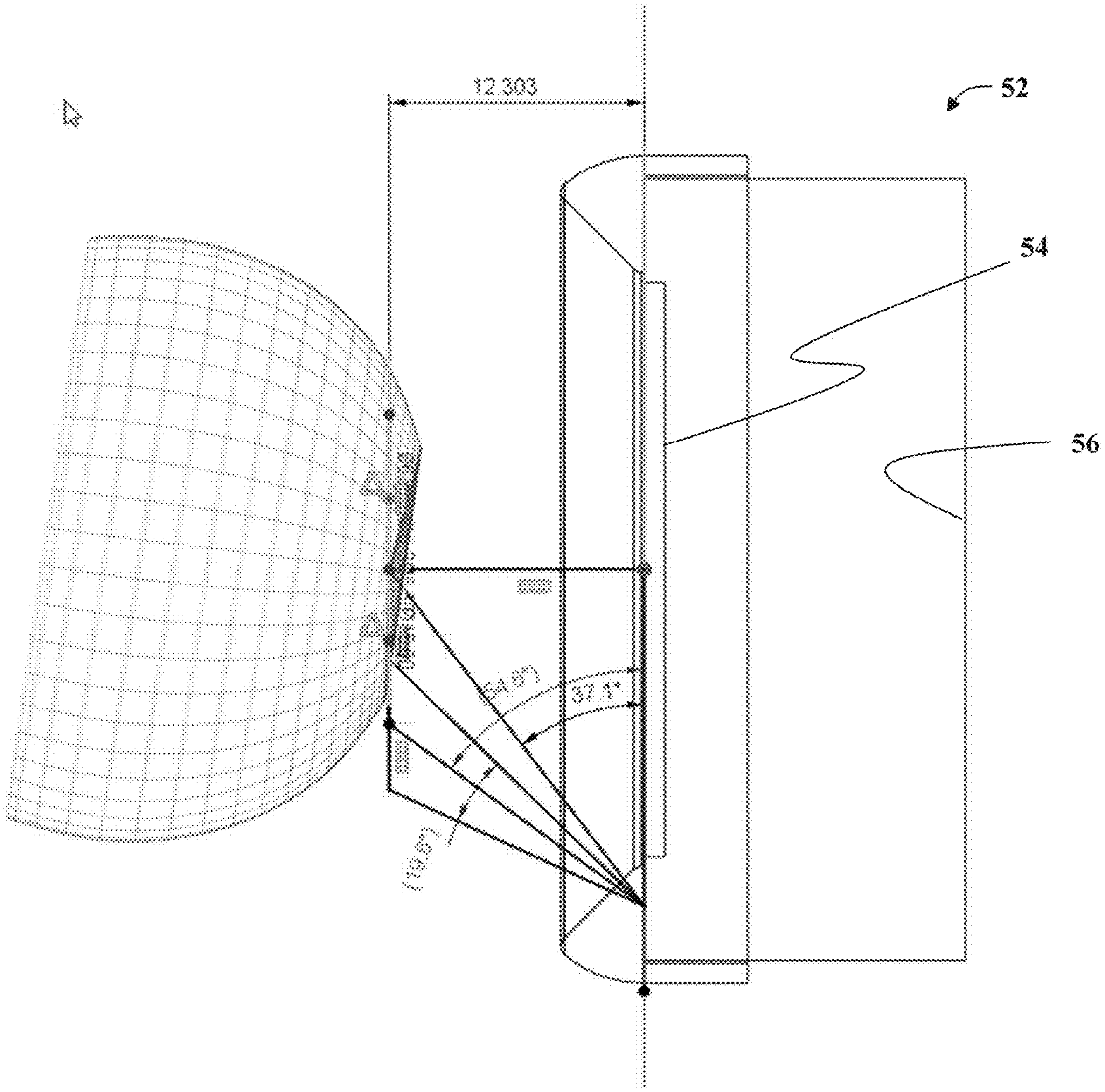

Each PSOG assembly 52 includes a display housing 53, a micro-OLED display 56, an eye tracking assembly 22, and a pancake lens 54. The display housing 53 includes a substantially cylindrical shape having an inner surface extending along a longitudinal axis 60 between a first end 62 and second end 64 and defining an interior cavity 66 extending between the first end 62 and the second end 64. The micro-OLED display 56 is coupled to the display housing 53 and positioned within the interior cavity 66 adjacent the second end 64 of the display housing 53. The eye tracking assembly 22 is coupled to the display housing 53 and positioned adjacent the first end 62 of the display housing 53. The pancake lens 54 is mounted to the display housing 53 and positioned within the interior cavity 66 between the eye tracking assembly 22 and the micro-OLED display 56 along the longitudinal axis 60. As shown in FIG. 25, the pancake lens 54 may be positioned adjacent to eye tracking assembly 22 such that a first distance 68 defined between the pancake lens 54 and the eye tracking assembly 22 along the longitudinal axis 60 is less than a second distance 70 defined between the pancake lens 54 and the micro-OLED display 56 along the longitudinal axis 60.

The eye tracking assembly 22 includes a ring support frame 24 that is coupled to the first end 62 of the display housing 53, a plurality of photosensors 28 that are coupled to the ring support frame 24, and a plurality of light emitters 26 that are coupled to the ring support frame 24. As shown in FIGS. 22-27, in some embodiments, the pancake lens 54 is substantially disk shaped and the ring support frame 24 extends around a perimeter of the pancake lens 54 such that the plurality of photosensors 28 and the plurality of light emitters 26 are arranged around a perimeter of the pancake lens 54.

In the illustrated embodiment, the VR wearable assembly 110 also includes the controller 20 that includes a processor operatively coupled to the plurality of photosensors 28 and the plurality of light emitters 26. The processor 20 is configured to execute the algorithm 200 (shown in FIG. 6) including the steps of operating the light emitters 26 to emit light towards the patient's eye, detecting reflected light from the patient's eye via the photosensors 28, and determining a gaze position of the patient's eye based on intensities of the reflected light detected by the photosensors 28.

As shown in FIG. 22, in some embodiments, the eye tracking assembly 22 may also include a first group 44 of photosensors 28 and a first group 48 of light emitters 26 corresponding to the first group 44 of photosensors 28, and include a second group 46 of photosensors 28 and a second group 50 of light emitters 26 corresponding to the second group 46 of photosensors 28. For example, the first group 44 of photosensors 28 and the first group 48 of light emitters 26 may be orientated on a first side 72 of the ring support frame 24, and the second group 46 of photosensors 28 and the second group 50 of light emitters 26 may be orientated on a second side 74 of the ring support frame 24 opposite the first groups 44, 48 of photosensors 28 and light emitters 26. The processor 20 may be configured to execute the algorithm 200 including the steps processor is configured to execute the algorithm including the steps of alternatingly operate the first and second groups 44, 46, 48, 50 of photosensors 28 and light emitters 26, and determining the gaze position of the patient's eye based on intensities of the reflected light detected by the alternated groups 44, 46 of photosensors 28. For example, the predefined subsets 48, 50 of the emitters 26 may alternately illuminate the eye forming Illumination setup A and Illumination setup B with the illumination setups differing by angle of illumination and/or wavelength of light (800 nm-900 nm).

In some embodiments, the eye tracking assembly 22 may include one or more thermistors 30 that are coupled to the ring support frame 24 and configured to sense an ambient temperature adjacent the ring support frame 24 and/or an interior of the VR wearable assembly 110. For example, the thermistors 30 may be mounted to the ring support frame 24 and positioned between first and second groups 44, 46, 48, 50 of photosensors 28 and light emitters 26. The processor 20 may be configured to execute the algorithm 400 (shown in FIG. 11) including the steps of receiving the sensed ambient temperature adjacent the ring support frame 24 from the thermistor 30, determining an estimated temperature of the photosensors 28 based on the sensed ambient temperature adjacent the ring support frame 24 and a coefficient based on the VR wearable assembly, and compensating the photosensor measurement error based on the estimated temperature of the photosensors 28. The processor 20 then executes algorithm 200 to include determining the gaze position of the patient's eye based on the intensities of the reflected light detected by the photosensors 28 and the compensated photosensor measurement error. For example, the processor 20 may determine an estimated temperature of the photosensors 28 using Equation 1, where K is heat transfer coefficient associated with the ring support frame 24 and/or the VR wearable assembly 110. The processor may also determine a compensating photosensor measurement error using Equation 2 based on the measured illumination readings from the photosensors 28 and the estimated temperature of the photosensors 28 calculated using Equation 1.

Figure 28:
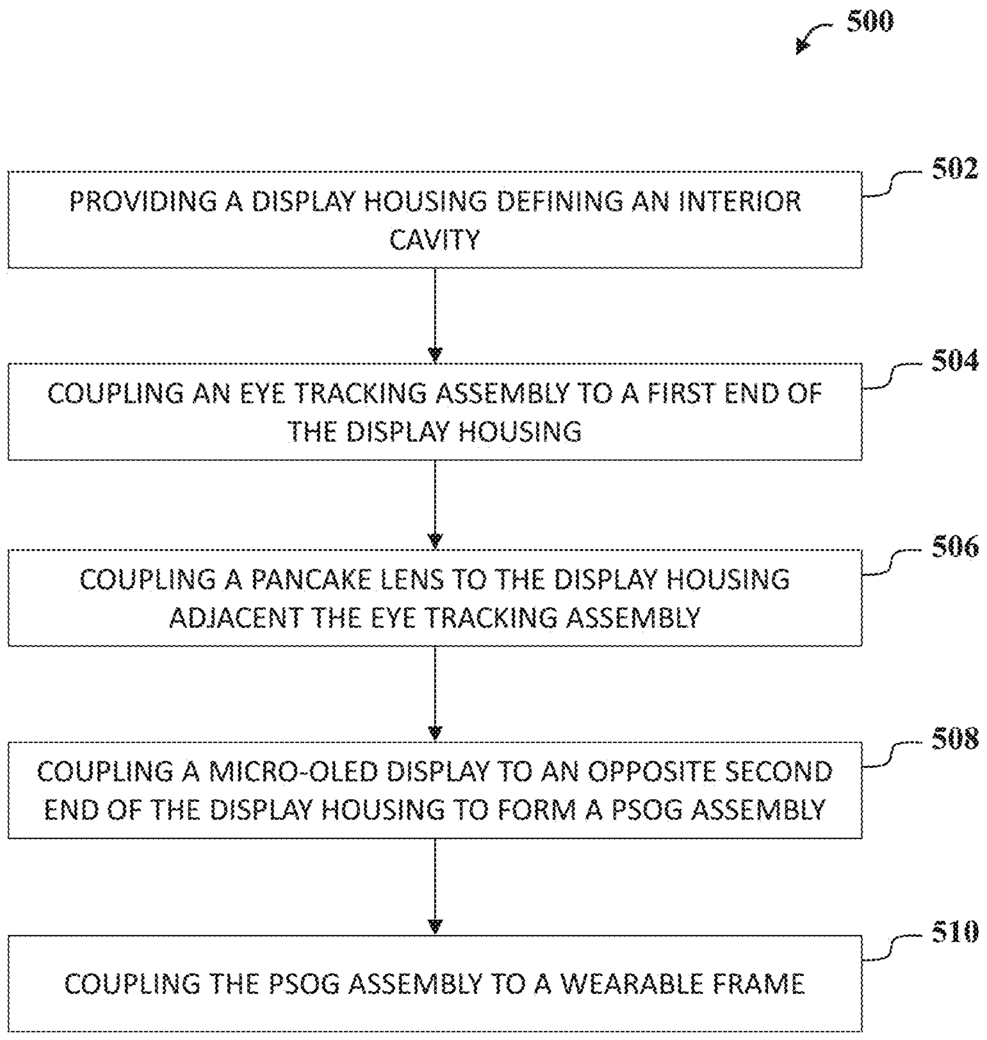
FIG. 28 is a flowchart illustrating a method of assembling the VR/AR-HMD unit show in FIGS. 12-21.

In some embodiments, as shown in FIG. 28, the present invention includes a method 500 of assembling a VR wearable assembly 110. The method includes a plurality of steps, and each method step may be performed independently of, or in combination with, other method steps. In the illustrated embodiment, the method 500 includes assembling a PSOG assembly 52 by performing method steps 502-508.

Method step 502 includes providing a display housing 53 is provided having a substantially cylindrical shape extending between a first end 62 and second end 64 and having an inner surface defining an interior cavity 66 extending between the first end 62 and the second end 64.

Method step 504 includes coupling the eye tracking assembly 22 to the display housing 53 positioned adjacent to the first end 62 of the display housing 53.

Method step 506 includes coupling the pancake lens 54 to the display housing 53 positioned within the interior cavity 66 and adjacent to the eye tracking assembly 22.

Method step 508 includes coupling the micro-OLED display 56 to the display housing 53 positioned within the interior cavity 66 and adjacent to the second end 64 of the display housing 53 such that the pancake lens 54 is orientated between the eye tracking assembly 22 and the micro-OLED display 56 along the longitudinal axis 60.

Method step 510 includes coupling the assembled PSOG assembly 52 to the rim 114 of a wearable frame 112 that is adapted to be worn over a patient's eyes. Method steps 502-508 are repeated to assemble the VR wearable assembly 110 having a second assembled PSOG assembly 52 mounted to the wearable frame 112 to form the VR wearable assembly 110 having a pair of PSOG assemblies 52, with each PSOG assembly 52 associated with a corresponding eye of the patient.

In some embodiments, the method 500 may include coupling a plurality of photosensors 28 to a ring support frame 24, coupling a plurality of light emitters 26 to the ring support frame 24, and coupling the ring support frame 24 to the first end 62 of the display housing 53. The method 500 may also include coupling a thermistor 30 to the ring support frame 24 that is configured to sense an ambient temperature adjacent the ring support frame 24. The method may also include operatively coupling a processor 20 to the photosensors 28, the light emitters 26, and the thermistor 30. The processor 20 is configured to execute the algorithms 200, 300, and 400 including the steps of operating the light emitters to emit light towards the patient's eye, detecting reflected light from the patient's eye via the photosensors, and receiving the sensed ambient temperature adjacent the ring support frame from the thermistor, determining an estimated temperature of the photosensors based on the sensed ambient temperature adjacent the ring support frame and a coefficient based on the VR wearable assembly using Equation 1, compensating photosensor measurement error based on the estimated temperature of the photosensors using Equation 2, and determining the gaze position of the patient's eye based on the intensities of the reflected light detected by the photosensors and the compensated photosensor measurement error.

Referring to FIGS. 29-32, in some embodiments, the controller 20 includes non-transitory computer-readable storage media having computer-executable instructions embodied thereon that cause the processor 34 of the controller 20 to perform algorithms 600, 700, 800, and 900 including steps for providing a minimal-latency eye position data for aiding the foveated rendering. The methods include a plurality of steps, and each method step may be performed independently of, or in combination with, other method steps.

Figure 32:
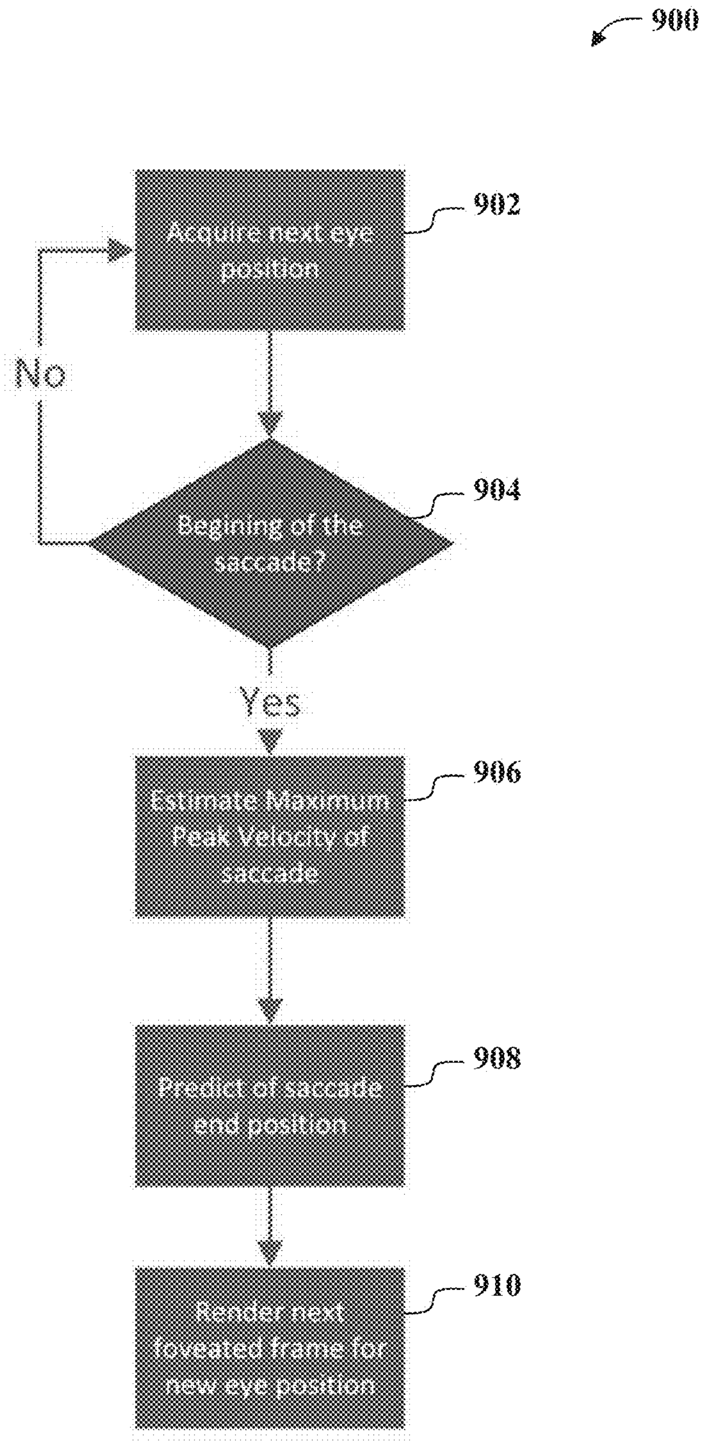

For example, referring to FIG. 32, in some embodiments, the processor 34 may be programmed to execute method step 902 and acquire a next eye position using the eye tracking assembly 22. In method step 904, the processor 34 detects a movement of the eye position and determines whether the eye movement is the beginning of a saccade. If the processor 34 does not detect a saccade, the processor 34 returns to method step 902 and acquires the next eye position using the eye tracking assembly 22. Upon detecting the beginning of a saccade, the processor 34 executes method step 906 including estimating a maximum peak velocity of the saccade. The processor 34 then executes methods step 908 including predicting a saccade end position based on the estimated maximum peak velocity of the saccade determined in method step 906. The processor 34 then renders a next foveated frame on the display device for a new eye positioned based on the predicted saccade end position determined in method step 910.

Figure 29:
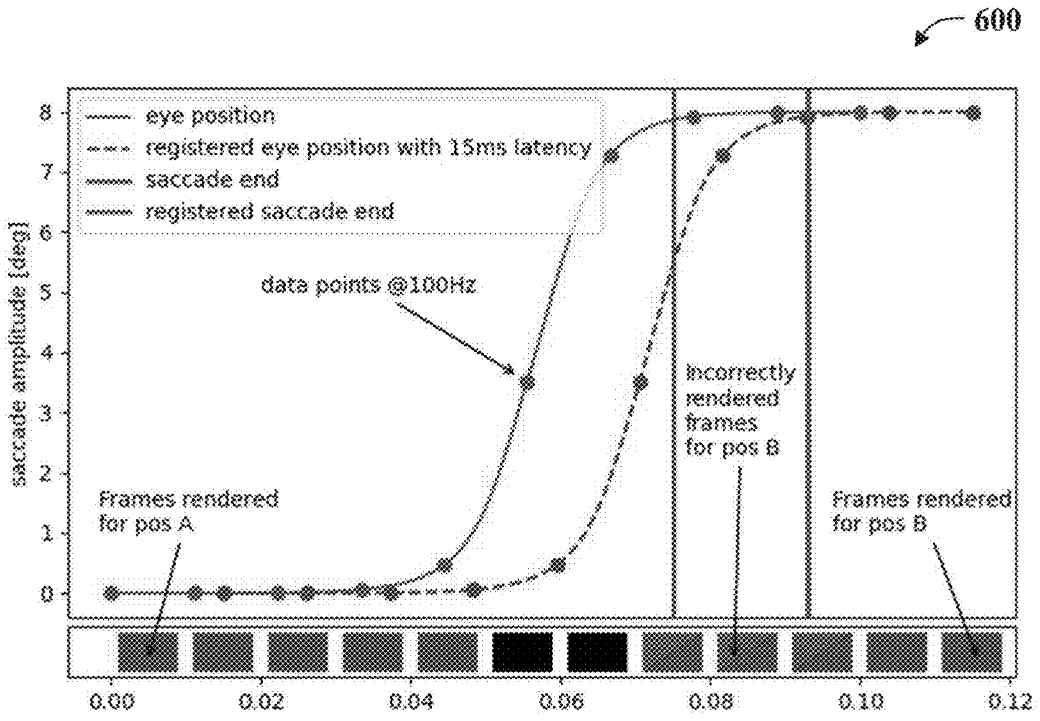
FIGS. 29-32 are illustrations of algorithms that may be executed by the system to generate minimal latency for aiding the foveated rendering with the VR/AR-HMD unit show in FIGS. 1 and 12-21.
Figure 30:
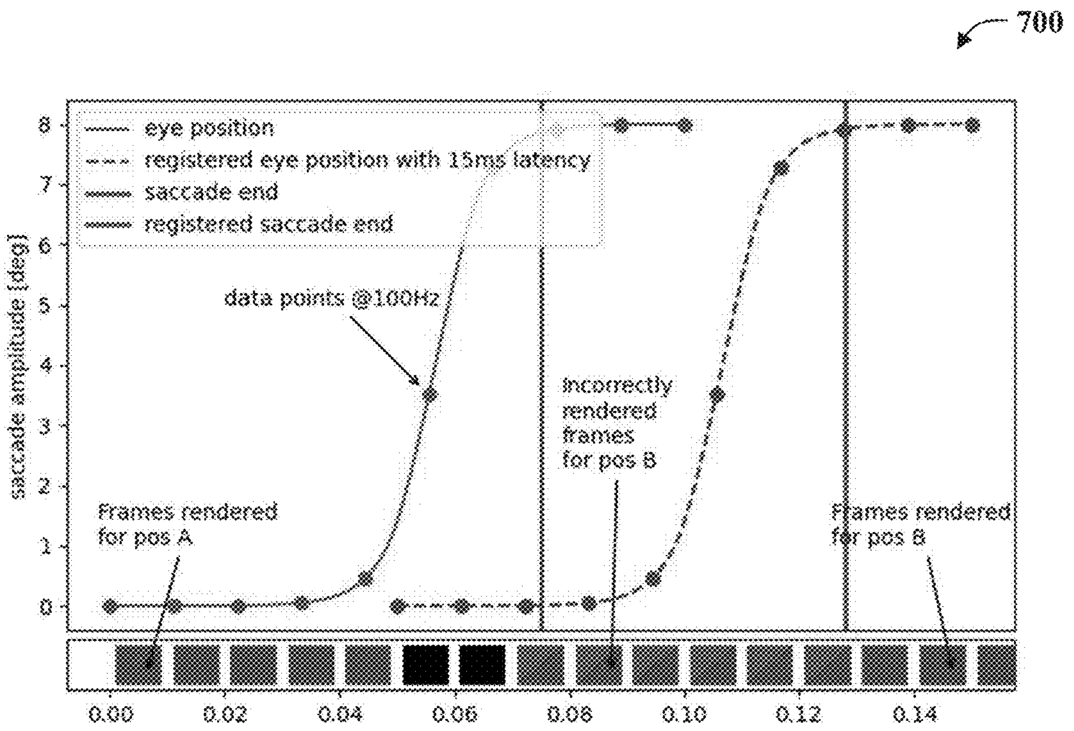

Referring to FIGS. 29-30, in order to perform a foveated rendering eye tracker needs to deliver information about eye position with lowest possible latency to reduce amount of inaccurate foveated images. Inaccurate foveated image is a foveated image rendered for different eye position. This is especially crucial after the fast eye movements called saccades. High amount of inaccurate foveated images results in low VR experience for the user. FIGS. 29-30 illustrate theoretical saccades registered with eye tracker with sampling rate of 100 Hz and frames rendered with the display with 100 frames per second (rectangles below). The system can consider two foveated frames for position before saccade (green rectangles) and after (blue rectangles). The system may assume best latency of 15 ms and slowest 50 ms (this is only eye tracker latency, without whole system latency. As shown, 3 and 6 inaccurately rendered frames with addition of rendering latency can result in up to 90 ms.

The system solves these problems by providing processor 34 that is programmed to adjust a rendering procedure of displayed image for head mounted display. Processor 34 includes an eye-tracking module including a data acquisition and processing module for eye-movement registration. In some embodiments, the eye-tracking module is based on signal processing from photosensors positioned to gather information. The data acquisition and processing module estimates current eye position data and allows for prediction of the eye position before the end of the saccade and after the maximum peak velocity of the saccade. For example, processor 34 is programmed to execute algorithm 900, shown in FIG. 32 to render foveated images. Maximum peak velocity of the saccade is in very strict relationship with saccade amplitude. Therefore, the processor 34 can predict eye position before the end of saccade, if the system can gather this information faster than half of the time of saccade.

Figure 31:
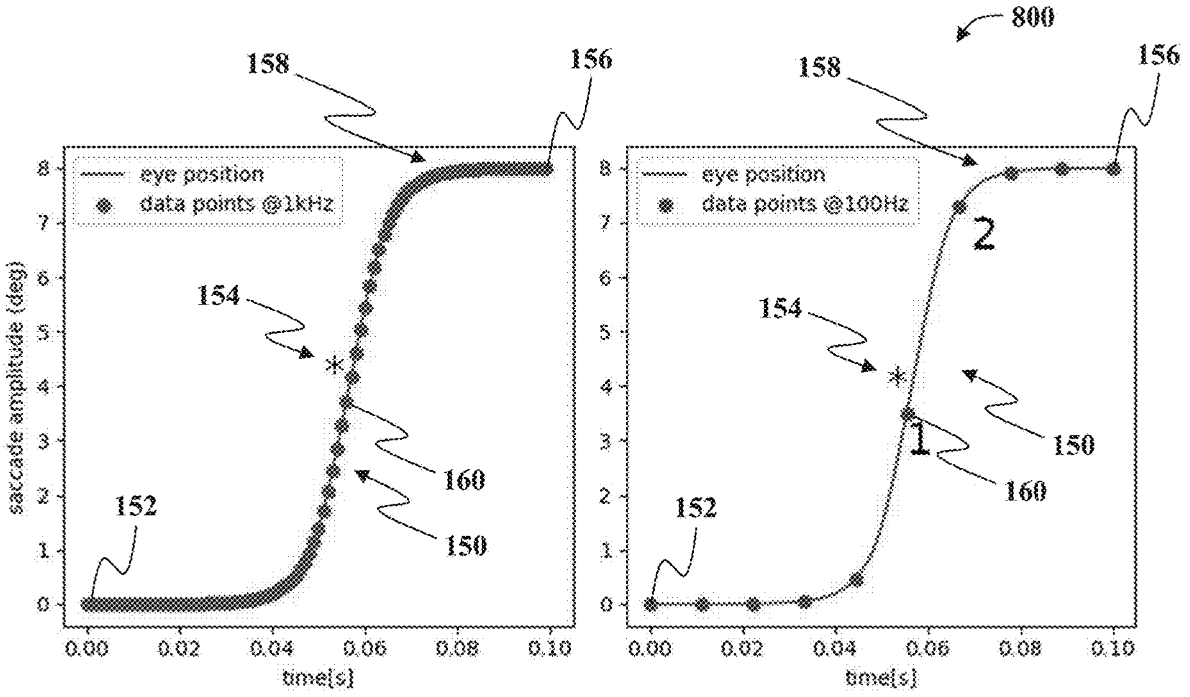

As shown in FIG. 31, the eye motion is registered using a set of simple photosensors that can measure small changes in reflected from infrared amount of light between sclera and fovea. A precisely positioned set of sensors can deliver enough information about those changes to reconstruct eye position—this technique is called PSOG (photosensor oculography). The main advantage is that PSOG-based system needs very basic signal processing technique, and therefore can be implemented using real-time embedded system—delivering sampling rate of 1 kHz with latency of ~1 ms. In comparison to the Video Oculography that inherently is prone to (beside very bulky and high-end laboratory hardware like EyeLink 100 Plus). Utilizing PSOG allows the system to move from image processing to signal processing in to estimate eye position data and this provides high sampling rates (1 kHZ) at very low latencies (~1 ms) in comparison to Video Oculography. Moreover, such high sampling rates allow to predict the eye position data to especially at the end of the saccade.

It is well-known that the saccade maximum peak velocity is in near-linear relationship with saccade amplitude, therefore knowing the maximum peak velocity (marked with (*) on FIG. 31), can very precisely position of the eye. FIG. 31 shows how much of the data points the system can gather at different sampling rates (1 kHz—our systems vs 100 Hz—average sampling rate of HMD-enabled VOG). The system can get information about max peak velocity almost exactly at the time it is present, while the system at 100 Hz needs at least points (1) and (2) to estimate it (shown in FIG. 31), and adding the system latency time (optimistically 15 ms) result in too high latency to use this information for rendering a foveated image. In this way, the processor 34 can providing a minimal-latency eye position data for aiding the foveated rendering by performing the algorithm steps of acquiring the eye position using the eye tracking system 18, determining the beginning of a saccade, estimating a maximum peak velocity of saccade, predicting saccade end position and determining a new eye gaze position based on saccade end position, and rendering the next foveated for the new eye position.

In some embodiments, the system includes an apparatus providing data to render images displayed in real-time on the head mounted display 10, 110. The system includes an eye movement tracking system 18 and a processor 34 including an eye-tracking module including a data acquisition and processing module for eye-movement registration. The eye movement tracking is based on processing signals from photosensors positioned to gather eye movement information. The data acquisition and processing module estimates current eye parameters and allows for prediction eye position at the end of the eye saccade. The system may also include an apparatus providing eye position data for real-time and ahead-of-time foveated rendering for the head mounted display 10, 110. The apparatus includes a light source configured to illuminate an area of a user's eye, a processor 34 that includes a data acquisition module and an eye-tracking module for eye-movement registration and eye-movement prediction, and a communication system that notifies a rendering system that new position for foveated rendering is ready. The eye movement tracking may be based on processing signals from photosensors positioned to gather eye movement information. The data acquisition and processing module then estimates current eye parameters and allows for prediction eye position before the end of the eye saccade. In some embodiments, the saccade end-position is predicted. The system then notifies the HMD rendering system that it is needed to use new eye-position. The new position of the eye may be computed using prediction subsystem of the saccade end-position, or other eye types of eye-movements (smooth pursuit or intersaccadic drift).

In some embodiments, the system includes a VR/AR wearable assembly 10, 110 that includes a wearable frame 112 adapted to be worn over a patient's eyes, a display device 14, 56 mounted to the wearable frame 112, a PSOG assembly 52 mounted to the wearable frame 112 and including an eye tracking assembly 22, and a processor 34 coupled to the PSOG assembly 52 and the display device 14, 56. The processor includes an eye-tracking module configured to execute an algorithm to render computer-generated images on the display device 14, 56. For example, the processor 34 may be programmed to execute the algorithms 600, 700, 800, and 900 including steps of detecting a saccade 150 (shown in FIG. 31) of a corresponding eye of the patient via the eye tracking assembly 22 and determining an initial saccade gaze position location 152 of the corresponding eye associated with the detected saccade 150. The processor 34 then determines a peak velocity 154 of the saccade 150 and determines a final saccade end gaze position 156 based on the determined peak velocity 154 of the saccade 150. The processor 34 then renders a foveated image on the display device 14, 56 at an image location corresponding to the determined final saccade end gaze position 156.

For example, the PSOG assembly 52 may include a support frame 24, a light source 26 mounted to the support frame 24 and configured to illuminate an area of the corresponding eye, and a plurality of photosensors 28 mounted to the support frame and configured to receive reflected light from different portions of the illuminated corresponding eye. The processor 34 may be programmed to execute the algorithms 600, 700, 800, and 900 including the steps of determining eye movement tracking based on processing signals from the plurality of photosensors positioned to gather eye movement information.

In some embodiments, the processor 34 may be programmed to execute the algorithms 600, 700, 800, and 900 including the steps of determining an amplitude 158 of the saccade 150 based on the determined peak velocity 154, and determining the final saccade end gaze position 156 based on the determined amplitude of the saccade 150. The processor 34 may also be programmed to determine an intermediate gaze position location 160 of the corresponding eye associated with the detected saccade 150, and determine the final saccade end gaze position 156 based on the amplitude 158 of the saccade 150, the initial saccade gaze position location 152, and the intermediate gaze position location 160 of the corresponding eye. In some embodiments, the processor 34 may also execute the algorithms 600, 700, 800, and 900 including the steps of estimating current eye parameters and predicting eye position before the end of the saccade 150.

In some embodiments, the processor 34 may also be programmed to execute the algorithms 600, 700, 800, and 900 including the steps of the processor is programmed to execute the algorithm including the steps of detecting an other type of eye-movement of the corresponding eye via the eye tracking assembly 22, determining a first gaze position location associated with the detected other type of eye-movement, estimating corresponding eye parameters associated with the detected other type of eye-movement, predicting a second eye position based on the estimated corresponding eye parameters associated with the detected other type of eye-movement, and rendering a second foveated image on the display device corresponding to the determined second eye position. For example, the processor may detect the other type of eye-movement including at least one of a smooth pursuit and an intersaccadic drift.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

The device and methods of the present invention are not limited to the specific embodiments described herein and/or described in but rather, components of the device and/or steps of the method may be utilized independently and separately from other components and/or steps described herein. For example, the eye tracking systems may also be used in combination with other systems and methods, and is not limited to practice with only the HMD units as described herein. Rather, an exemplary embodiment can be implemented and utilized in connection with many other visual display applications.

The above description of illustrated examples of the present invention are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A virtual reality/augmented reality (VR/AR) wearable assembly comprising:

a wearable frame adapted to be worn over a patient's eyes;

a pair of photosensor oculography (PSOG) assemblies mounted to the wearable frame, each PSOG assembly including:

a micro-OLED display;

an eye tracking assembly including a plurality of light emitters configured to illuminate an area of a corresponding eye and a plurality of photosensors configured to receive reflected light from different portions of the illuminated corresponding eye; and a substantially disk-shaped pancake optics positioned between the eye tracking assembly and the micro-OLED display; and a processor coupled to each PSOG assembly, the processor including an eye-tracking module configured to execute an algorithm to render computer-generated images on the display device including the steps of:

determining eye movement tracking based on processing signals from the plurality of photosensors positioned to gather eye movement information;

detecting a movement of the eye position of the corresponding eye of the patient via a corresponding eye tracking assembly and determining whether the detected eye movement is the beginning of a saccade;

upon determining the eye movement is the beginning of a saccade, determining an initial saccade gaze position location of the corresponding eye associated with the saccade;

determining a peak velocity of the saccade;

determining an amplitude of the saccade based on the determined peak velocity;

determining a final saccade end gaze position based on the determined peak velocity and the determined amplitude of the saccade; and rendering a foveated image on a corresponding micro-OLED display at an image location corresponding to the determined final saccade end gaze position.

2. The VR/AR wearable assembly of claim 1, wherein each PSOG assembly includes:

a ring support frame coupled to the wearable frame;

a first group of photosensors and light emitters mounted along a first side of the ring support frame; and a second group of photosensors and light emitters mounted along a second side of the ring support frame opposite the first group of photosensors and light emitters.

3. The VR/AR wearable assembly of claim 1, wherein the processor is programmed to execute the algorithm including the steps of:

determining an intermediate gaze position location of the corresponding eye associated with the detected saccade; and determining the final saccade end gaze position based on the amplitude of the saccade, the initial saccade gaze position location, and the intermediate gaze position location of the corresponding eye.

4. The VR/AR wearable assembly of claim 1, wherein the processor is programmed to execute the algorithm including the steps of:

estimating current eye parameters and predicting eye position before the end of the saccade.

5. The VR/AR wearable assembly of claim 1, wherein the processor is programmed to execute the algorithm including the steps of:

detecting an other type of eye-movement of the corresponding eye via the eye tracking assembly;

determining a first gaze position location associated with the detected other type of eye-movement;

estimating corresponding eye parameters associated with the detected other type of eye-movement;

predicting a second eye position based on the estimated corresponding eye parameters associated with the detected other type of eye-movement; and rendering a second foveated image on the display device corresponding to the determined second eye position.

6. The VR/AR wearable assembly of claim 5, wherein the processor is programmed to execute the algorithm including the steps of:

detecting the other type of eye-movement including at least one of a smooth pursuit and an intersaccadic drift.

7. The VR/AR wearable assembly of claim 2, wherein each PSOG assembly includes:

a thermistor mounted to the ring support frame between the first and second group of photosensors and light emitters for sensing an ambient temperature adjacent the ring support frame.

8. A method of operating a VR/AR wearable assembly including a wearable frame adapted to be worn over a patient's eyes, a pair of PSOG assembles mounted to the wearable frame with each PSOG assembly including a micro-OLED display, an eye tracking assembly including a plurality of light emitters configured to illuminate an area of a corresponding eye and a plurality of photosensors configured to receive reflected light from different portions of the illuminated corresponding eye, and a substantially disk-shaped pancake optics positioned between the eye tracking assembly and the micro-OLED display, and a processor coupled to each PSOG assembly, the method including the processor performing an algorithm to render computer-generated images on the display device including the steps of:

determining eye movement tracking based on processing signals from the plurality of photosensors positioned to gather eye movement information;

detecting a movement of the eye position of the corresponding eye of the patient via a corresponding eye tracking assembly and determining whether the detected eye movement is the beginning of a saccade;

upon determining the eye movement is the beginning of a saccade, determining an initial saccade gaze position location of the corresponding eye associated with the saccade;

determining a peak velocity of the saccade;

determining an amplitude of the saccade based on the determined peak velocity;

determining a final saccade end gaze position based on the determined peak velocity and the determined amplitude of the saccade; and rendering a foveated image on a corresponding micro-OLED display at an image location corresponding to the determined final saccade end gaze position.

9. The method of claim 8, wherein each PSOG assembly includes:

a ring support frame coupled to the wearable frame;

a first group of photosensors and light emitters mounted along a first side of the ring support frame; and a second group of photosensors and light emitters mounted along a second side of the ring support frame opposite the first group of photosensors and light emitters.

10. The method of claim 8, including the processor performing the algorithm including the steps of:

determining an intermediate gaze position location of the corresponding eye associated with the detected saccade; and determining the final saccade end gaze position based on the amplitude of the saccade, the initial saccade gaze position location, and the intermediate gaze position location of the corresponding eye.

11. The method of claim 8, including the processor performing the algorithm including the steps of:

estimating current eye parameters and predicting eye position before the end of the saccade.

12. The method of claim 8, including the processor performing the algorithm including the steps of:

detecting an other type of eye-movement of the corresponding eye via the eye tracking assembly;

determining a first gaze position location associated with the detected other type of eye-movement;

estimating corresponding eye parameters associated with the detected other type of eye-movement;

predicting a second eye position based on the estimated corresponding eye parameters associated with the detected other type of eye-movement; and rendering a second foveated image on the display device corresponding to the determined second eye position.

13. The method of claim 12, including the processor performing the algorithm including the steps of:

detecting the other type of eye-movement including at least one of a smooth pursuit and an intersaccadic drift.

14. The method of claim 9, wherein each PSOG assembly includes a thermistor mounted to the ring support frame between the first and second group of photosensors and light emitters for sensing an ambient temperature adjacent the ring support frame.

15. A non-transitory computer-readable storage media having computer-executable instructions embodied thereon for operating a VR/AR wearable assembly including a wearable frame adapted to be worn over a patient's eyes, a pair of PSOG assemblies mounted to the wearable frame with each PSOG assembly including a micro-OLED display, an eye tracking assembly including a plurality of light emitters configured to illuminate an area of a corresponding eye and a plurality of photosensors configured to receive reflected light from different portions of the illuminated corresponding eye, and a substantially disk-shaped pancake optics positioned between the eye tracking assembly and the micro-OLED display, and a processor coupled to each PSOG assembly, when executed by the processor the computer-executable instructions cause the processor to perform an algorithm to render computer-generated images on the display device including the steps of:

determining eye movement tracking based on processing signals from the plurality of photosensors positioned to gather eye movement information;

detecting a movement of the eye position of the corresponding eye of the patient via a corresponding eye tracking assembly and determining whether the detected eye movement is the beginning of a saccade;

upon determining the eye movement is the beginning of a saccade, determining an initial saccade gaze position location of the corresponding eye associated with the saccade;

determining a peak velocity of the saccade;

determining an amplitude of the saccade based on the determined peak velocity;

determining a final saccade end gaze position based on the determined peak velocity and the determined amplitude of the saccade; and rendering a foveated image on a corresponding micro-OLED display at an image location corresponding to the determined final saccade end gaze position.

16. The non-transitory computer-readable storage media of claim 15, wherein each PSOG assembly includes:

a ring support frame coupled to the wearable frame;

a first group of photosensors and light emitters mounted along a first side of the ring support frame; and a second group of photosensors and light emitters mounted along a second side of the ring support frame opposite the first group of photosensors and light emitters.

17. The non-transitory computer-readable storage media of claim 15, wherein the computer-executable instructions cause the processor to perform the algorithm including the steps of:

determining an intermediate gaze position location of the corresponding eye associated with the detected saccade; and determining the final saccade end gaze position based on the amplitude of the saccade, the initial saccade gaze position location, and the intermediate gaze position location of the corresponding eye.

18. The non-transitory computer-readable storage media of claim 15, wherein the computer-executable instructions cause the processor to perform the algorithm including the steps of:

estimating current eye parameters and predicting eye position before the end of the saccade.

19. The non-transitory computer-readable storage media of claim 15, wherein the computer-executable instructions cause the processor to perform the algorithm including the steps of:

detecting an other type of eye-movement of the corresponding eye via the eye tracking assembly;

determining a first gaze position location associated with the detected other type of eye-movement;

estimating corresponding eye parameters associated with the detected other type of eye-movement;

predicting a second eye position based on the estimated corresponding eye parameters associated with the detected other type of eye-movement; and rendering a second foveated image on the display device corresponding to the determined second eye position.

20. The non-transitory computer-readable storage media of claim 19, wherein the computer-executable instructions cause the processor to perform the algorithm including the steps of:

detecting the other type of eye-movement including at least one of a smooth pursuit and an intersaccadic drift.

* * * * *